(12) United States Patent
Isogai et al.

(10) Patent No.: US 7,464,692 B2
(45) Date of Patent: Dec. 16, 2008

(54) INTAKE AIR CONTROL VALVES

(75) Inventors: Tomiharu Isogai, Obu (JP); Takuji Nakamura, Kariya (JP)

(73) Assignees: Aisan Kogyo Kabushiki Kaisha, Obu-shi, Aichi-ken (JP); Denso Corporation, Kariya-shi, Aichi-ken (JP)

( * ) Notice: Subject to any disclaimer, the term of this patent is extended or adjusted under 35 U.S.C. 154(b) by 0 days.

(21) Appl. No.: 11/768,238

(22) Filed: Jun. 26, 2007

(65) Prior Publication Data

US 2008/0000458 A1 Jan. 3, 2008

(30) Foreign Application Priority Data

Jun. 28, 2006 (JP) .............................. 2006-177928

(51) Int. Cl.
*F02D 9/10* (2006.01)
*F02M 7/00* (2006.01)

(52) U.S. Cl. ..................... 123/337; 123/336; 123/361; 251/305

(58) Field of Classification Search ................ 123/336, 123/337, 361, 396, 399; 251/304, 305, 307, 251/129.11; 29/890.12, 890.127
See application file for complete search history.

(56) References Cited

U.S. PATENT DOCUMENTS

| | | | |
|---|---|---|---|
| 5,823,165 A * | 10/1998 | Sato et al. ................... | 123/399 |
| 5,875,758 A * | 3/1999 | Fujita ......................... | 123/336 |
| 6,761,348 B2 * | 7/2004 | Michels et al. .............. | 251/305 |
| 6,866,027 B1 * | 3/2005 | Marchesini et al. ......... | 123/480 |
| 7,025,040 B2 * | 4/2006 | Hoshino et al. ............. | 123/399 |
| 7,069,902 B2 * | 7/2006 | Arai et al. ................... | 123/337 |
| 7,077,104 B2 * | 7/2006 | Iannone et al. .............. | 123/399 |
| 7,219,651 B2 * | 5/2007 | Yamamoto et al. .......... | 123/306 |
| 7,225,792 B2 * | 6/2007 | Nakamura et al. .......... | 123/337 |
| 7,314,032 B2 * | 1/2008 | Nakayama ............. | 123/184.55 |
| 7,367,124 B2 * | 5/2008 | Hannewald ............... | 29/890.12 |

FOREIGN PATENT DOCUMENTS

JP          614635          2/1994

* cited by examiner

*Primary Examiner*—Willis R. Wolfe, Jr.
*Assistant Examiner*—Johnny H. Hoang
(74) *Attorney, Agent, or Firm*—Dennison, Schultz & MacDonald

(57) ABSTRACT

An intake air control valve has a bore defining member and a butterfly-type valve member that includes a shaft and a valve body. The valve body has a pair of valve portions joined to the shaft and rotatable between a fully closed position and a fully opened position; Each of the valve portions has a central portion and opposite end portions along a direction of the rotational axis of the valve member. The thickness of each of the valve portions gradually increases from the central portion toward the end portions.

20 Claims, 17 Drawing Sheets

INTAKE AIR CONTROL VALVES

This application claims priority to Japanese patent application serial number 2006-177928, the contents of which are incorporated herein by reference.

BACKGROUND OF THE INVENTION

1. Field of the Invention

The present invention relates to intake air control valves used for controlling the flow of intake air that is supplied to an internal combustion engine. In this specification, the term "intake air control valves" is used to broadly include various types of valves and devices for controlling the flow of intake air, such as those known as "throttle bodies", "throttle valve devices", "throttle control devices", "intake air control devices" and "metering valve devices".

2. Description of the Related Art

A known intake air control valve is disclosed, for example, in Japanese Laid-Open Utility Model Publication No. 6-14635. FIG. 27 shows such a known intake air control valve in a cross sectional view.

According to the intake air control valve shown in FIG. 27, a valve shaft 3 is rotatably supported within a valve body 5. The valve body 5 defines a bore 6, through which intake air flows. A butterfly-type valve plate 1 is inserted into a slit 4 formed in the valve shaft 3 and is fastened thereto by screws 8. The valve plate 1 can open and close the bore 6 of the valve body 5 as the valve shaft 3 rotates. A mount seat 1a protrudes from the valve plate 1 and contacts with the valve shaft 3 in order to prevent the valve shaft 3 from being warped by the tightening force that is applied during the tightening operation of the screws 8.

With the intake air control valve shown in FIG. 27, the valve plate 1 has an elliptical configuration and has a uniform thickness, except for a portion having the mount seat 1a. The elliptical configuration is determined such that an outer diameter of the valve plate 1 as viewed in a direction of flow of air within the bore 6 is slightly smaller than an inner diameter of the bore 6 (hereinafter called "bore diameter") when the valve plate 1 is in a fully closed position. Therefore, when the valve plate 1 is in the fully closed position, for example, during the idle driving operation, a substantial clearance is produced between the outer diameter of the valve plate 1 and the inner wall of the bore 6. For this reason, the intake air leaks from the upstream side to the downstream side through such a clearance. As a result, the amount of leakage of intake air (hereinafter also called "air leakage amount") increases.

Even in the case that a usual valve plate having a perfect circular configuration is used, the outer diameter of the valve plate is generally determined to be smaller than the bore diameter. Therefore, also in this case, the intake air flows though the clearance between the outer diameter of the valve plate and the inner wall of the bore when the valve plate is in a fully closed position. As a result, a problem of leakage of the intake air is still caused. Simply configuring the valve plate to have an outer diameter equal to the bore diameter may reduce the air leakage amount. However, with this configuration, the valve plate may tend to frictionally contact with the inner wall of the bore. Therefore, this design is not appropriate, because the operability of the valve plate is degraded.

SUMMARY OF THE INVENTION

It is accordingly an object of the present invention to teach intake air control valves that can reduce the amount of leakage of intake air when a valve member is in a fully closed position, while ensuring the operability of the valve member.

One aspect according to the present invention includes intake air control valves including a bore defining member and a butterfly-type valve member. The bore defining member defines a bore, through which an intake air flows. The valve member includes a shaft and a valve body. The shaft is rotatably supported by the bore defining member and defines a rotational axis. The valve body includes a pair of valve portions joined to the shaft, so that the valve body or the valve member can rotate in a closing direction and an opening direction between a fully closed position and a fully opened position. Each of the valve portions has an opening-side face, a closing-side face and a thickness between the opening-side face and the closing-side face. The thickness of each of the valve portions gradually increases from a central portion toward opposite end portions along a direction of the rotational axis.

With this arrangement, as the valve member rotates, the valve portions can open and close the bore, so that the amount of the intake air flowing through the bore can be controlled. Because the thickness of each of the valve portions gradually increases from the central portion toward the end portions, it is possible to reduce the amount of leakage of flow of the intake air through a potential clearance that may be produced between the valve member and an inner wall of the bore when the valve member is in the fully closed position. Thus, even if a clearance is set between the valve member and an inner wall of the bore in order to ensure the operability of the valve member when the valve member is in the fully closed position, the above determination of the thickness of the valve portions can produce resistance against flow of the intake air, which resistance gradually increases from the central portion toward the end portions of each valve portion. Therefore, it is possible to increase the amount of flow of the intake air when the valve member is in the fully opened position.

In addition, because the thickness at the central portion of each valve portion is thinner than the thickness at the end portions, it is possible to reduce or minimize the interference with the flow of the intake air flowing through the bore, in particular the flow at a higher speed of the intake air at the central region of the bore. Thus, in comparison a valve member having valve portions with a constant thickness (e.g., a thickness that is the same as the thickness at the opposite end portions of the valve member in the case of the present invention) throughout the length in a direction of the rotational axis, it is possible to reduce the resistance against flow of the intake air. Therefore, it is possible to further reduce the amount of leakage of flow of the intake air through the potential clearance when the valve member is in the fully closed position.

In one embodiment, the thickness of the end portions of each of the valve portions is set to be twice or more of the thickness of the central portion. With this determination, it is possible to increase the resistance against flow of the intake air that flows through the potential clearance between the valve portions and the inner wall of the bore, in particular portions of the clearance on the sides of the end portions of the valve portions, when the valve member is in the fully closed position.

In another embodiment, each of the valve portions further includes a closing-side peripheral corner on the side of the closing direction. When the valve member is in the fully closed position, the closing-side peripheral corner is positioned proximally to or within a plane that extends through the rotational axis of the valve member and perpendicular to an axis of the bore. For example, the position of the peripheral corner may be displaced from the plane by a small distance or a small angle in a direction toward the opening side or the closing side. The opening-side face is configured as a concave face with a concave depth. The concave depth on the side of the central portion along the direction of the rotational axis is deeper than the concave depth on the sides of the end portions. With this configuration of the opening-side face, it is possible to reduce the resistance against flow of the intake air when the valve member is in the fully opened position. Therefore, the amount of flow of the intake air can be increased when the valve member is in the fully opened position.

In a further or an alternative embodiment, the closing side face extends parallel to a plane extending through the rotational axis. When the valve member is in the fully closed position, the closing-side peripheral corner is displaced toward the opening direction from the plane that extends through the rotational axis of the valve member and perpendicular to an axis of the bore.

With this arrangement, it is possible to improve the operability of the valve member in comparison with an arrangement where the closing side peripheral corner is displaced toward the closing direction from the plane that extends through the rotational axis of the valve member and perpendicular to the axis of the bore. In addition, the concave configuration of the opening-side face can reduce the resistance against flow of the intake air when the valve member is in the fully opened position. Therefore, the amount of flow of the intake air can be increased when the valve member is in the fully opened position.

In a further embodiment, the fully opened position is set to a position where a central axis of the valve member extending through the rotational axis is displaced toward the closing direction from the plane that extends through the rotational axis of the valve member and perpendicular to an axis of the bore. With this arrangement, it is possible to reduce the differences between upstream-side cross sectional areas and downstream-side cross sectional areas of the valve portions in either front or back side thereof with respect to a plane expending through the bore axis when the valve member is in the fully opened position. Therefore, it is possible to reduce the loss of pressure of the flow of the intake air and to eventually increase the amount of flow of the intake air when the valve member is in the fully opened position.

In a still further embodiment, the valve body further includes a support portion configured to support the valve portions. The support portion has a central part and opposite end parts along the direction of the rotational axis. The support portion has a projected area as viewed in a direction of flow of the intake air through the bore when the valve member is in the fully opened position. The projected area at the central part is smaller than the projected area at the opposite end parts. With this configuration, it is possible to further reduce the resistance against flow of the intake air when the valve member is in the fully opened position. Hence, it is possible to increase the amount of flow of the intake air when the valve member is in the fully opened position.

In a still further embodiment, the valve body further includes inclined surfaces extending from the outer faces of the support portion toward radially outer peripheries along the rotational axis of the valve portions. With this arrangement, it is possible to prevent or minimize separation of flow of the intake air from the valve body when the valve body or the valve member is in the fully opened position. Therefore, the intake air can smoothly flow along the valve body. As a result, it is possible to increase the amount of flow of the intake air when the valve member is in the fully opened position.

Preferably, the inclined surfaces may be formed on the closing side of the valve portions and may extend between the outer faces of the support portion and the closing-side faces of the valve portions. In addition, the inclined surfaces may be inclined relative to the bore axis when the valve member is in the fully opened position.

In a still further embodiment, the valve portions of the valve member are molded by resin. Therefore, by utilizing the flexibility in configuration available by the resin molding process, it is possible to eliminate subsequent machining operations such as cutting operations for completing the valve member, so that the manufacturing cost can be reduced.

In a still further embodiment, the shaft includes a pair of shaft members disposed on opposite sides of the valve member along the direction of the rotational axis. Alternatively, the shaft may be a single shaft member that extends through the valve body along the rotational axis.

Another aspect according to the present invention includes intake air control valves having a body member and a butterfly-type valve member. The body member defines a bore, through which an intake air flows. The valve member has a rotational axis and is rotatably disposed within the bore. The valve member includes a valve body having a first face, a second face and a thickness between the first face and a second face. The first face and the second face are disposed on opposite sides with respect to a rotational direction of the valve body. The valve body has a central portion and opposite end portions along a direction of the rotational axis. The thickness of the central portion is less than the thickness of the end portions.

In one embodiment, the valve body has a support portion and a pair of valve portions. The support portion extends along the rotational axis and the pair of valve portions are disposed on opposite sides of the support portion. The thickness at each of the support portion and the pair of valve portions of the valve body gradually increases from the central portion toward the opposite end portions.

A further aspect according to the present invention includes intake air control valves having a body member and a butterfly-type valve member. The body member defines a bore, through which an intake air flows. The valve member has a rotational axis and is rotatably disposed within the bore. The valve member includes a valve body having a support portion and a pair of valve portions. The support portion extends along the rotational axis and the pair of valve portions are disposed on opposite sides of the support portion. Each of the valve portions has an opening-side face and a closing-side face. The opening-side face defines a flat surface and the closing-side face defines a concave face, so that a thickness of each of the valve portions gradually increases from a central portion toward opposite end portions along a direction of the rotational axis. The support portion has a central part and oppose end parts along the rotational axis. The support portion has a cross sectional area that gradually increases from the central part toward the opposite end parts.

DETAILED DESCRIPTION OF THE INVENTION

Each of the additional features and teachings disclosed above and below may be utilized separately or in conjunction with other features and teachings to provide improved intake air control valves and methods of manufacturing such valves. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

First Embodiment

A first embodiment according to the present invention will now be described with reference to FIGS. 1 to 8. In this embodiment, an electronically controlled throttle body having a valve member controlled to open and close by a motor is disclosed as an example of an intake air control valve. For the purpose of explanation, the throttle body will be first described in general. Thereafter, the explanation of the primary portion of the valve member will be made.

Figure 1:
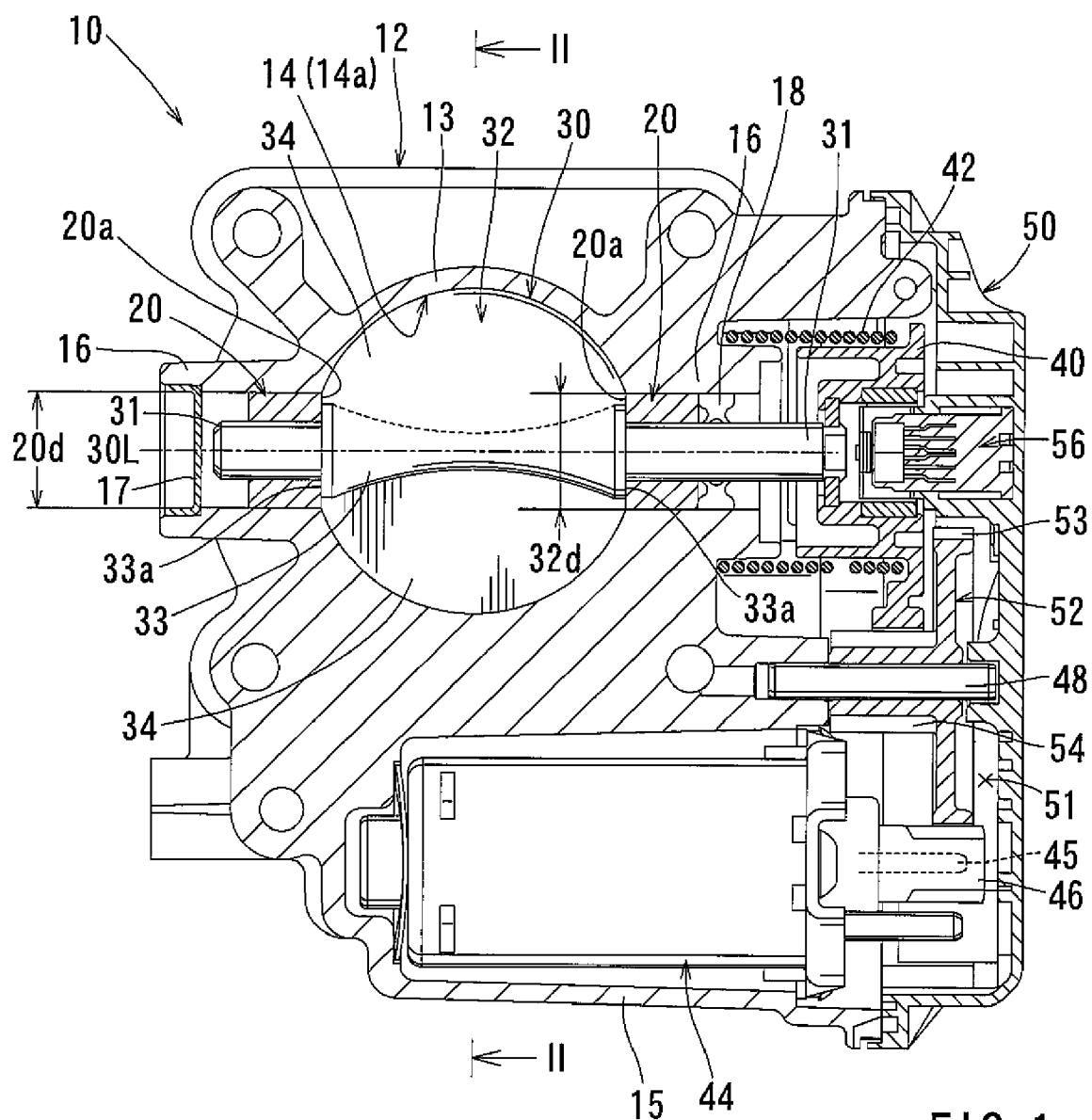
FIG. 1 is a horizontal sectional view of a throttle body incorporating an intake air control valve according to a first embodiment of the present invention.

Referring to FIG. 1, a throttle body 10 generally includes a body member 12 and a valve member 30. The body member 12 is made of resin and includes a bore wall portion 13 and a motor receiving portion 15. The bore wall portion 13 has a substantially cylindrical tubular configuration with a hollow space that defines a bore 14 through which intake air can flow (see FIG. 2). The upstream side (left side as viewed in FIG. 2) of the bore wall portion 13 communicates with an air cleaner (not shown). The downstream side (right side as viewed in FIG. 2) of the bore wall portion 13 communicates with an intake manifold (not shown). Therefore, the intake air flows from the air cleaner toward the intake manifold via the bore 14 of the bore wall portion 13. For this reason, the body member 12 may be called "a bore defining member."

As shown in FIG. 1, a pair of right and left bearing boss portions 16 are formed integrally with the bore wall portion 13. A pair of right and left bearings 20 are configured as cylindrical tubular metal bushes and are respectively integrated with the corresponding bearing boss portions 16 by an insertion molding process. The bearings 20 are respectively positioned relative to the bearing boss portions 16. A pair of right and left shaft portions 31 of a valve member 30 (that will be described later) are respectively rotatably supported by the corresponding bearings 20. A plug 17 seals the open end of the left-side bearing boss portion 16. A seal member 18 made of resilient material, such as rubber, seals between the right side bearing boss portion 16 and the right side shaft portion 31. The bearing 20 is provided on the side of the body member 12, and therefore, may be called as "a member or a portion on the side of the body member 12" or "a member or a portion on the side of the bore defining member."

Figure 4:
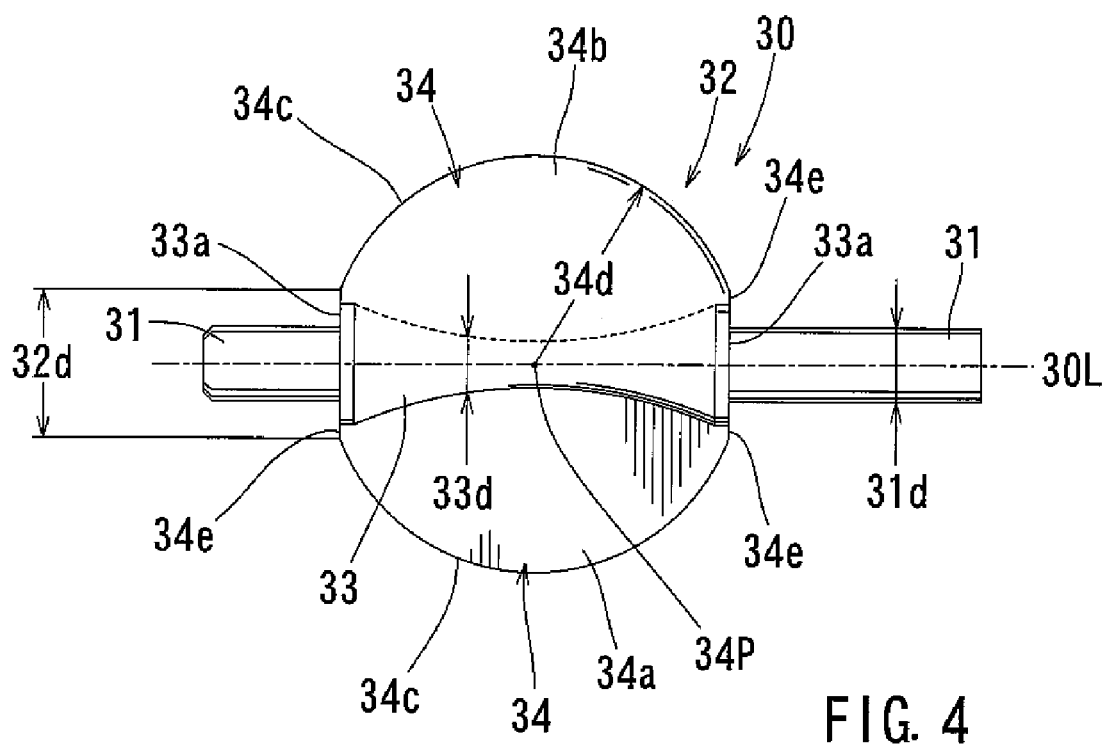
FIG. 4 is a plane view of the valve member.

The valve member 30 is a resin-molded product and is integrally molded by resin. As shown in FIG. 4, the valve member 30 includes the right and left shaft portions 31, which are rotatably supported by the corresponding bearings 20 disposed on the side of the body member 12 (see FIG. 1), and a butterfly-type valve body 32 that serves to open and close the bore 14 (see FIG. 1). The right and left shaft portions 31 and the valve body 32 extend along an axial line 30L. The valve body 32 has a support portion 33 and a pair of valve portions 34. The support portion 33 extends along the same axial line 30L as the shaft portions 31. The valve portions 34 protrude in opposite directions (upper and lower directions in FIG. 4) from the support portion 33 and have semi-circular configurations so as to jointly form a single circular disk in appearance (see FIGS. 5 to 8). As the valve body 32 rotates together with the shaft portions 31 about the axial line 30L, the bore 14 within the bore wall portion 13 of the body member 12 (see FIG. 1) is opened and closed by the valve body 32, so that the flow of the intake air within the bore 14 can be controlled. The axial line 30L of the valve member 30 also may be called "rotational axis 30L."

As shown in FIG. 1, the right-side shaft portion 31 of the valve member 30 extends through the right-side bearing boss portion 16 of the body member 12. A throttle gear 40 that may be a sector gear made of resin is fixedly attached to the right-side shaft portion 31. A back spring 42, such as a coil spring, is interposed between the throttle gear 40 and the body member 12 in order to normally bias the throttle gear 40 in a closing direction. The motor receiving portion 15 of the body member 12 has a substantially cylindrical tubular configuration with a left-side bottom and a right-side opening. A drive motor 44, such as a DC motor, is received within the motor receiving portion 15 and is fixed in position therewithin. A motor pinion 46 that may be made of resin is fixedly attached to an output end of a motor shaft 45 of the drive motor 44.

A resin cover member 50 is attached to the body member 12 for closing the open end on the right side as viewed in FIG. 1 of the body member 12. A countershaft 48 has opposite ends respectively supported by the body member 12 and the cover member 50. A counter gear 52 that may be made of resin is rotatably supported on the countershaft 48. The counter gear 52 includes a large gear portion 53 and a small gear portion 54 that are disposed on the same axis but have different diameters from each other. The large gear portion 53 is in engagement with the motor pinion 46 and the small gear portion 54 is in engagement with the throttle gear 40. A reduction gear mechanism is constituted by the throttle gear 40, the motor pinion 46 and the counter gear 52 and is received within a gear receiving space 51 that is defined between the body member 12 and the cover member 50. A throttle position sensor 56 is mounted to the cover member 50 for detecting the opening angle of the valve member 30.

The drive motor 44 of the throttle body 10 (see FIG. 1) is controlled by a controller, such as an engine control unit (ECU) of an automobile (not shown), based on control signals, such as an accelerator signal representing the depressing amount of an accelerator pedal, a traction control signal, a constant speed travel signal, and an idle speed control signal. The drive output of the motor shaft 45 of the drive motor 44 is transmitted from the motor pinion 46 to the valve member 30 via the counter gear 52 and the throttle gear 40, so that the valve member 30 rotates. Therefore, the valve body 32 of the valve member 30 can open and close the bore 14 for controlling the amount of intake air flowing through the bore 14.

Figure 2:
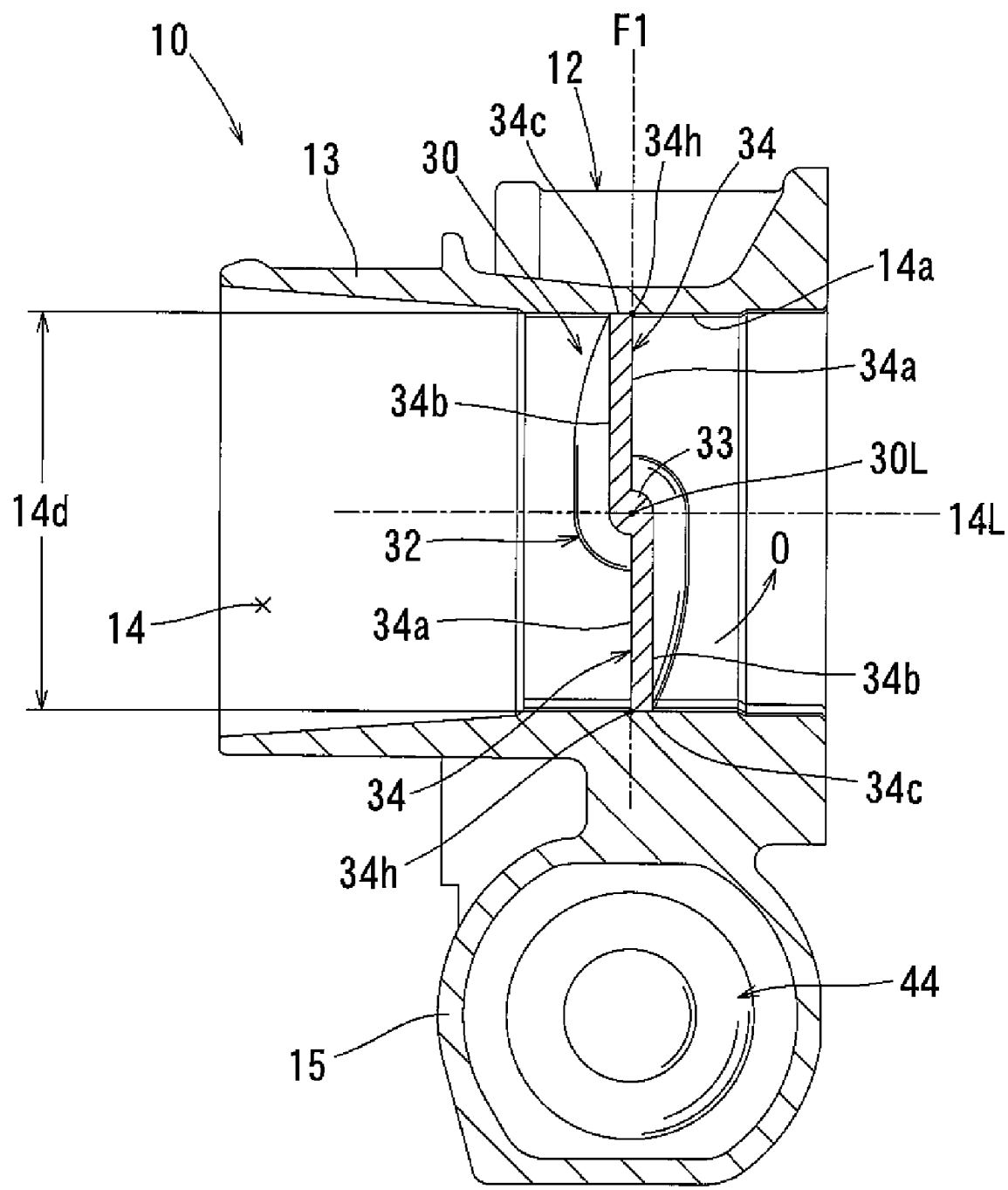
FIG. 2 is a cross sectional view taken along line II-II in FIG. 1.
Figure 3:
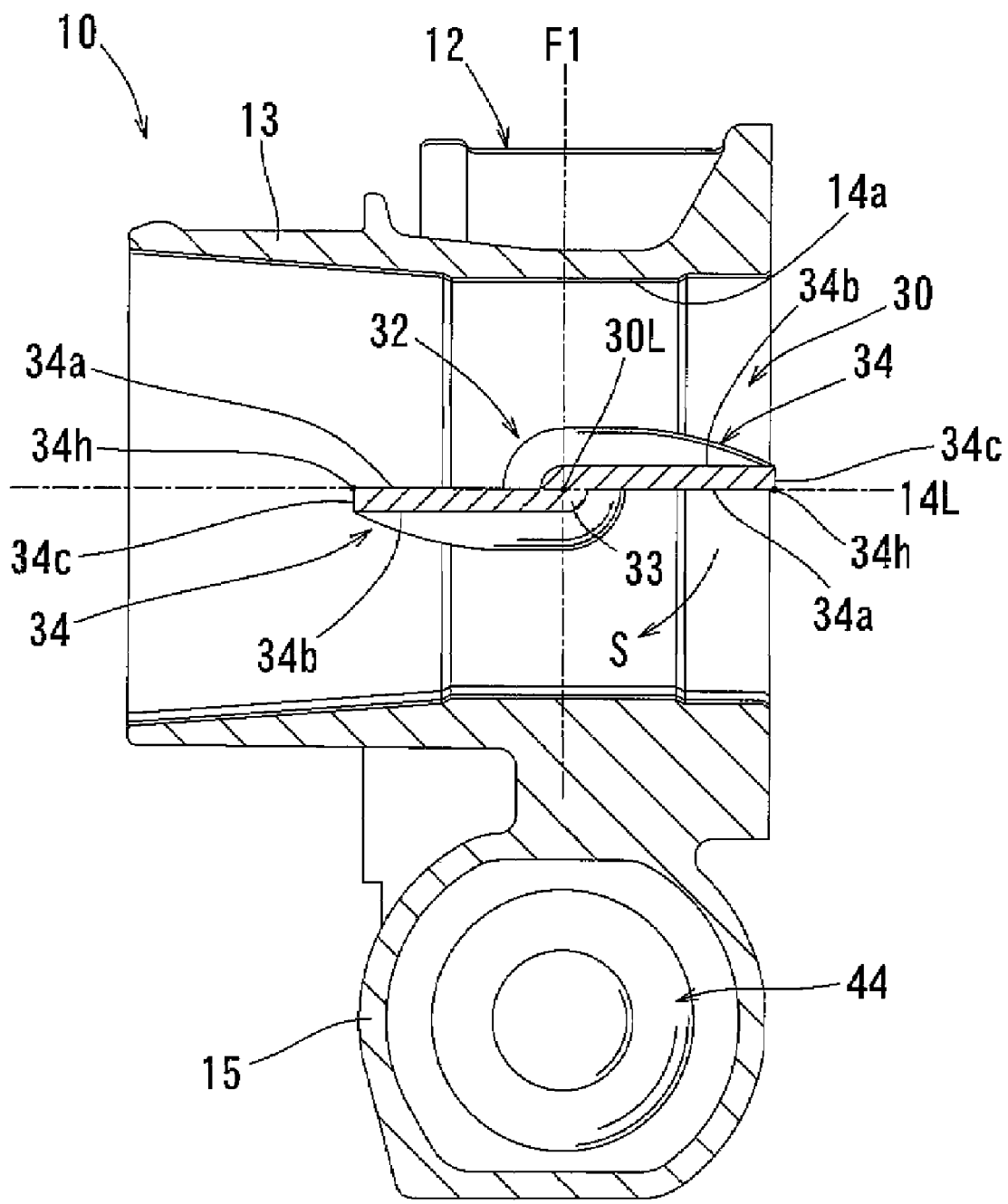
FIG. 3 is a cross sectional view similar to FIG. 2 but showing a valve member in a fully opened position.

In this embodiment, the bore 14 is opened as the valve member 30, more specifically the valve body 32, rotates in an opening direction (as indicated by arrow 0 in FIG. 2) from a fully closed position (see FIG. 2). On the contrary, the bore 14 is closed as the valve member 30, more specifically the valve body 32, rotates in a closing direction (as indicated by arrow S in FIG. 3) from a fully opened position (see FIG. 3).

In this embodiment, the fully opened position (see FIG. 3) of the valve member 30 is determined to be the position where the valve member 30 is displaced from the fully closed position (see FIG. 2) by an angle of 90° in the opening direction (as indicated by arrow O in FIG. 2). In other words, the fully opened position is determined to be the position where the central line of the valve member 30 extending through the rotational axis 30L is in alignment with an axis 14L of the bore 14. In this embodiment, the central line of the valve member 30 corresponds to a straight line extending within a plane defined by closing-side faces 34a of the valve portions 34.

On the other hand, the fully closed position (see FIG. 2) of the valve member 30 is determined to be the position where the closing side faces 34a of the valve portions 34 are in alignment with a plane F1 that extends through the axial line (i.e., the rotational axis) 30L of the valve member 30 and perpendicular to the axis 14L of the bore 14 of the body member 12. In this case, an angle θ between the plane F1 and a plane that is defined by the closing-side faces 34a of the valve portions 34 and intersects with the plane F1 on the axis 14L of the bore 14 is zero. Therefore, peripheral corners 34h on the closing side of the valve portions 34 are positioned within the plane F1 when the valve member 30 is in the fully closed position. Here, the peripheral corner 34h of each valve portion 34 is defined between the closing-side face 34a and an outer circumferential face 34c of the valve portion 34. Alternatively, the fully closed position of the valve member 30 may be determined to be the position where the peripheral corners 34h are displaced from the plane F1 in the opening direction (i.e., in a counterclockwise direction about the rotational axis 30L as viewed in FIG. 2). In an actual design, a small clearance is provided between the inner wall 14a of the bore 14 and the outer circumferential faces 34c of the valve portions 34. Therefore, the fully closed position of the valve member 30 may be determined to be the position where the peripheral corners 34h on the closing side of the valve portions 34 are displaced from the plane F1 by a small distance in the closing direction (i.e., in a clockwise direction about the rotational axis 30L as viewed in FIG. 2). Also with this arrangement, it is possible to open and close the valve member 30 without causing interference between the corner portions 34h of the valve portions 34 and the inner wall 14a of the bore 14.

A method of manufacturing the throttle body 10 will now be described in brief.

(1) First, the valve member 30 is resin-molded by an injection molding process using a valve-molding die. This molding process is performed while the shaft portions 31 and the valve body 32 are inserted into a cavity of the die. The shaft portions 31 and the valve body 32 are integrated with the valve body 30 by injecting the resin into the mold cavity (see FIGS. 3 and 4).

(2) Next, the body member 12 is resin-molded by an injection molding process using a body-molding die. This molding process is performed while the valve member 30 and the bearings 20 are inserted into a cavity of the die. The valve member 30 and the bearings 20 are integrated with the body member 12 by injecting the resin into the mold cavity.

(3) Finally, the plug 17, the sealing member 18, the back spring 42, the drive motor 44, the reduction gear mechanism and the cover member 50 are assembled to the body member 12 that has the valve member 30 inserted therein, so that the throttle body 10 (see FIG. 1) can be completed.

The valve member 30 will now be further described. As described previously, the valve member 30 has the right and left shaft portions 31 and the butterfly-type valve body 32. The valve body 32 has the support portion 33 and the pair of valve portions 34. The support portion 33 extends along the same axial line 30L as the shaft portions 31. The pair of valve portions 34 jointly form a single disk in appearance.

Each of the shaft portions 31 has a cylindrical configuration with a shaft diameter 31d. Each of opposite end faces 33a of the support portion 33, which respectively include corresponding end faces 34e of the valve portions 34, defines a plane perpendicular to the rotational axis 30L and has a diameter equal to or slightly smaller than an outer diameter 20d of the bearings 20 (see FIG. 1). In addition, each of end faces 20a of the bearings 20 (see FIG. 1) opposing to the end faces 33a of the support portion 33 defines a plane perpendicular to the rotational axis 30L. Therefore, each end face 33a of the support portion 33 and the end face 20a of the corresponding bearing 20 oppose to each other by their entire areas with a very small clearance provided therebetween. The axial movement of the valve member 30 is restricted by the end faces 20a of the bearings 20, which can slidably contact with the end faces 33a of the support portion 33. The end faces 20a of the bearing members 20 therefore define restricting surfaces that are provided on the side of the body member 12 or the bore defining member for restricting axial movement of the valve member 30. The end faces 33a of the support member 33 (including the end faces 34e of the valve portions 34 in the case of this embodiment) define end surfaces that can slidably contact with the end faces 20a of the corresponding bearing members 20. Therefore, the end faces 20a of the bearing members 20 may be called as "restricting surfaces."

Figure 6:
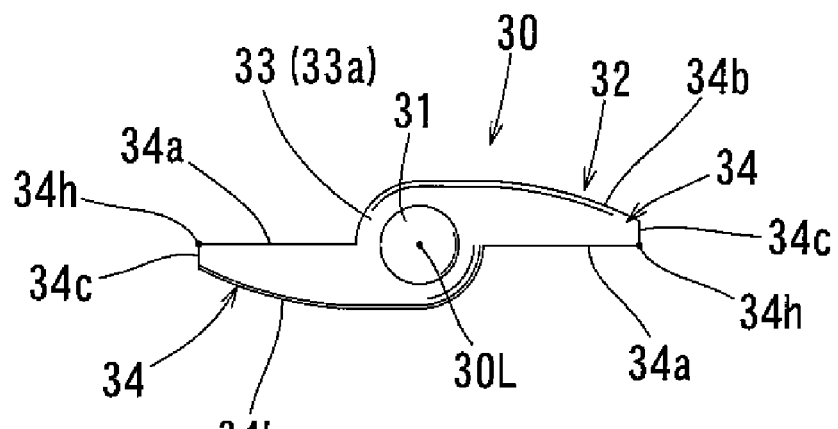
FIG. 6 is a side view of the valve member.
Figure 7:
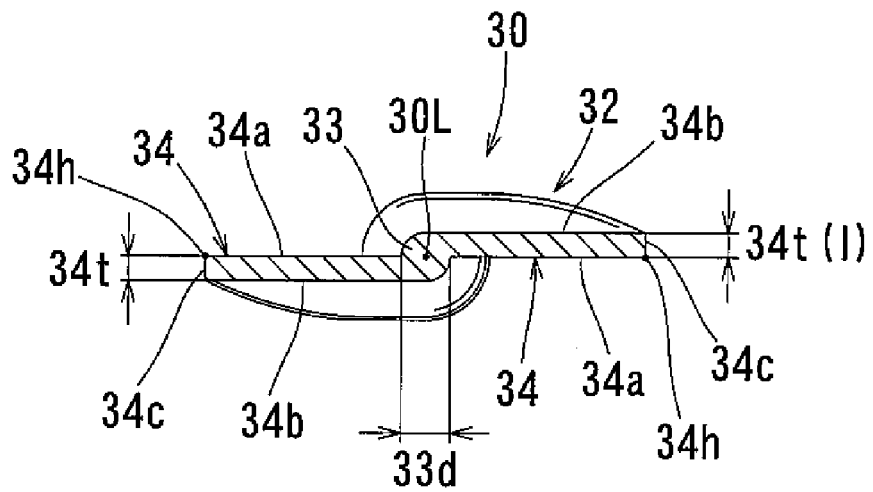
FIG. 7 is a cross sectional view taken along line VII-VII in FIG. 5.
Figure 8:
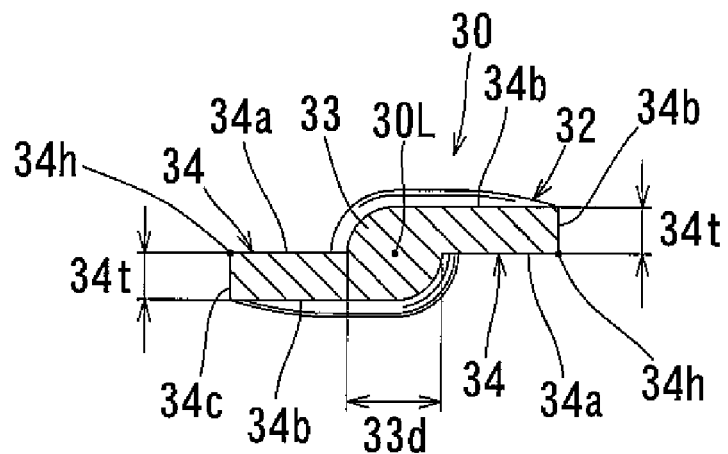
FIG. 8 is a cross sectional view taken along line VIII-VIII in FIG. 5.

The valve portions 34 are positioned symmetrically with respect to the rotational axis 30L of the support portion 33 (see FIGS. 6 to 8). More specifically, the closing faces 34a of the valve portions 34 are positioned within the plane that extends through the rotational axis 30L. As described previously, in the fully closed position (see FIG. 2) of the valve member 30, the closing-side faces 34a of the valve portions 34 are in alignment with the plane F1 that extends through the axial line 30L of the valve member 30 and perpendicular to the axis 14L of the bore 14. In addition, the plane defined by the closing-side faces 34a may include a central line of the valve member 30, which extends through the rotational axis 30L.

Figure 5:
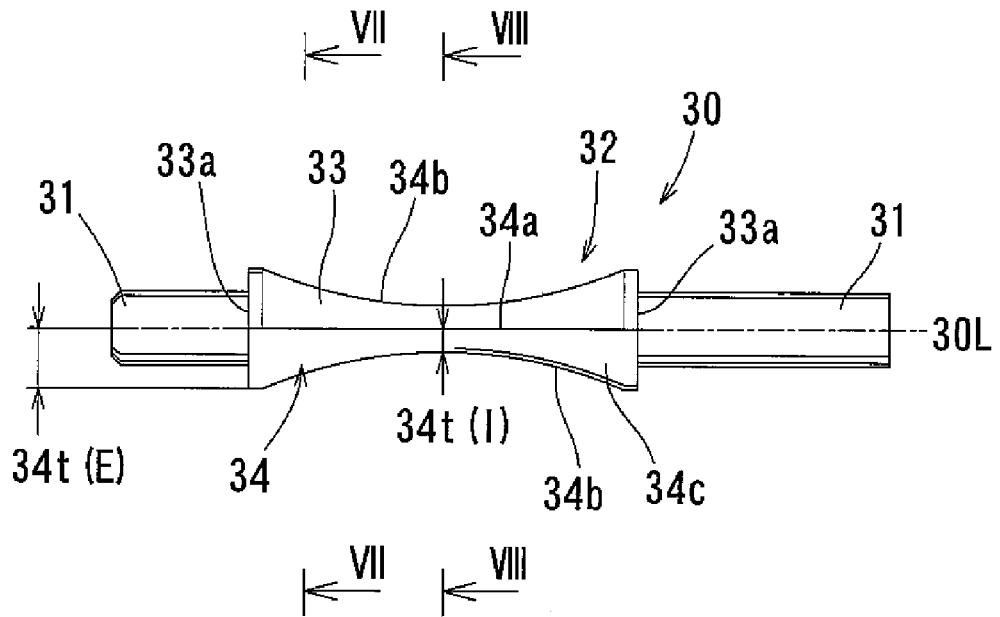
FIG. 5 is a front view of the valve member.

As shown in FIG. 5, each of the valve portions 34 has a thickness 34t that gradually increases in right and left directions as viewed in FIG. 5 from the central portion toward the shaft portions 31 along a direction of the rotational axis 30L. Therefore, an opening-side face 34b of each valve portion 34 is configured as a concave curved face. The concave depth at the central portion of the opening-side face 34b is deeper than the concave depth at end portions on the side of the shaft portions 31. The thickness 34t of each valve portion 34 is constant along the radial direction of the rotational axis 30L (see FIGS. 7 and 8). Further, the thickness 34t (indicated with suffix (E) in FIG. 5) at end portions of each valve portion 34 on the side of the corresponding shaft portion 31 is set to be equal to or more than twice the thickness 34t (indicated with suffix (I) in FIG. 5) at the central portion and to be smaller than a predetermined outer diameter 32d (see FIG. 4) of each end face 33a of the support portion 33.

As shown in FIG. 4, the outer circumferential faces 34c of the valve portions 34 are configured to jointly define a substantially cylindrical surface having a diameter 34d (hereinafter also called "valve diameter 34d") with respect to a point 34P on the rotational axis 30L that is in alignment with the axial line 14L of the bore 14 (see FIG. 2). The valve diameter 34d defined by the valve portions 34 is set to be slightly smaller than a diameter 14d of the bore 14 (see FIG. 2). In this context, the bore diameter 14d is the inner diameter of the bore wall 13 (i.e., the diameter of the inner wall 14a of the bore 14), in particular the inner diameter of a part of the bore wall 13, which opposes to the valve body 32 (more specifically the valve portions 34) of the valve member 30 when the valve member 30 is in the fully closed position.

The support portion 33 supports the valve portions 34 in a cantilever manner (see FIGS. 6 to 8). The support portion 33 has a circular cross sectional configuration and has a diameter 33d that gradually increases from its central portion toward opposite ends along the axial direction (se FIG. 4). The radius of the support portion 33 or half the outer diameter 33d is set to be equal to or greater than the thickness 34t of the valve portions 34. As shown in FIGS. 7 and 8, the opening-side faces 34b of the valve portions 34 extend tangentially from the support portion 33. Therefore, when the valve member 30 is in the fully opened position, the projected area of the support portion 33 as viewed in the direction of flow of air within the bore 14 (or as viewed from the upstream side of the valve member 30) is smaller than the projected area of a support portion that has a cylindrical configuration with a diameter corresponding to the maximum value of the outer diameter 33d throughout its length. In addition, the outer diameter 33d at the central portion of the support portion 33 is set to be smaller than the shaft diameter 31d of the shaft portions 31 (see FIG. 4).

According to the throttle body 10 as described above, the thickness 34t of each of the valve portions 34 gradually increases from the side of the central portion toward the side of the shaft portions 31 along the direction of the rotational axis 30L (see FIGS. 5 to 8). With this arrangement, even in the case that a clearance for ensuring the operability of the valve member 30 is provided between the outer circumferential faces 34c of the valve portions 34 and the inner wall 14a of the bore 14 when the valve member 30 is in the fully closed position, the resistance against the flow of the intake air flowing through the clearance increases from the side of the central portion toward the side of the shaft portions 31 along the direction of the rotational axis 30L Therefore, the amount of leakage of intake air through the clearance, which may be caused when the valve member 30 is in the fully closed position, can be reduced, while ensuring the operability of the valve member 30. In addition, it is possible to increase the amount of intake air flowing through the bore 14 when the valve member 30 is in the fully open position. Eventually, it is possible to reduce the rotational speed of the engine during the idling operation in order to improve the fuel economy.

In addition, the thickness 34t(I) of each valve portion 34 on the side of the central portion along the direction of the rotational axis 30L of the valve member 30 is smaller than the thickness 34t of the other portions (see FIG. 5). Therefore, when the valve member 30 is in the fully opened position, it is possible to minimize the interference of the valve portions 34 with the flow of intake air, which flows at a higher speed through the central region of the bore 14. Thus, the resistance against flow of the intake air, which may be produced when the valve member 30 is in the fully opened position, can be reduced in comparison with a design in which the thickness 34t of the valve portions 34 is set to a large value, which may be the same as the thickness 34t(E) on the side of the shaft portions 31, throughout the length along the direction of the rotational axis 30L. As a result, it is possible to increase the amount of intake air flowing through the bore 14 when the valve member 30 is in the fully open position. Eventually, it is possible to improve the output performance of the engine.

Further, the thickness 34t(E) of each valve portion 34 on the side of the corresponding shaft portion 31 is set to be equal to or more than twice the thickness 34t(I) of each valve portion 34 on the side of the central portion. Therefore, it is possible to increase the resistance against flow of the intake air flowing through a clearance produced between the outer circumferential faces 34c of the valve portions 34 and the inner wall 14a of the bore 14, in particular portion of the clearance produced on the side of the shaft portions 31 of the valve portions 34. As a result, it is possible to reduce the amount of leakage of the intake air.

Further, the thickness 34t(E) of each valve portion 34 on the side of the corresponding shaft portion 31 is set to be smaller than the outer diameter 32d (see FIG. 4) of each end face 33a (i.e., the slide contact end face) of the support portion 33, which can slidably contact with the end face 20a of the corresponding bearing 20. Therefore, it is possible to improve the operability of the valve member 30 in comparison with a design in which the thickness 34t(E) is larger than the outer diameter 32d of the end faces 33a of the support portion 33.

Furthermore, each valve portion 34 of the valve member 30 has the closing-side face 34a and the opening side-face 34b that are configured as follows. When the valve member 30 is in the fully closed position, the closing-side face 34a is in alignment with the plane F1 that extends through the axial line 30L of the valve member 30 and perpendicular to the axis 14L of the bore 14 of the body member 12. The opening side face 34b is configured as a concave curved face with a concave depth that is deeper on the side of the shaft portions 31 than the side of the central portion along the direction of the rotational axis 30L (see FIG. 2). As will be discussed below, this arrangement can improve the operability of the valve member 30 in comparison with a design in which the closing-side face 34a is displaced in the closing direction from the plane F1 when the valve member 30 is in the fully closed position.

For example, if the closing-side faces 34a of the valve portions 34 are displaced in the closing direction (i.e., a clockwise direction about the rotational axis 30L as viewed in FIG. 2) from the plane F1 when the valve member 30 is in the fully closed position, there is a possibility that the outer circumferential faces 34c of the valve portions 34 frictionally contact with or wedge against the inner wall 14a of the bore 14 as the valve member 130 is operated to open or close from the position in the vicinity of the fully closed position. This may cause degradation in operability of the valve member 130. Such a problem may not be caused in the case of the valve member 30 configured as described above. Each of the valve portions 34a of the valve member 30 has the closing-side face 34a that is in alignment with the plane F1 when the valve member 30 is in the fully closed position. In addition, the opening-side face 34b of each of the valve portions 34 is configured as a concave curved face with a concave depth deeper on the side of the shaft portions 31 than the side of the central portion along the direction of the rotational axis 30L.

Further, the support portion 33 that supports the valve portions 34 of the valve member 30 is configured such that, when the valve member 30 is in the fully opened position, the projected area of the support portion 33 as viewed in the direction of flow of air within the bore 14 is smaller than the projected area of a support portion that has a cylindrical configuration with a diameter (hereinafter also called "a maximum diameter 33d(max)") corresponding to the maximum value of the outer diameter 33d throughout its length. In other words, the support portion 33 has a rod-like configuration with the outer diameter 33d gradually increasing from the side of the central portion toward the side of the opposite ends along the axial direction. With this configuration, when the valve member 30 is in the fully opened position, the support portion 33 of this embodiment can reduce the resistance against the flow of intake air in comparison with a support portion configured as a cylindrical rod having the maximum diameter 33d(max) throughout its length. Therefore, it is possible to increase the amount of flow of intake air when the valve member 30 is in the fully opened position.

Further, because the outer diameter 33d at the central portion of the support portion 33 is smaller than the shaft diameter 31d of the shaft portions 31, the resistance against the flow of intake air can be further reduced when the valve member 30 is in the fully opened position. Therefore, it is possible to further increase the amount of flow of intake air when the valve member 30 is in the fully opened position.

In this embodiment, the valve member 30 is molded by resin. Therefore, by utilizing the flexibility in configuration available by the resin molding process, it is possible to eliminate subsequent machining operations, such as cutting operations, for completing the valve member 30. As a result, the manufacturing cost can be reduced. In addition, without need of attaching a separate member to the valve body 32 of the valve member 30, it is possible to form the valve portions 34 with the thickness 34t that gradually increases from the central portion toward the side of the shaft portions 31 along a direction of the rotational axis 30L.

Figure 9:
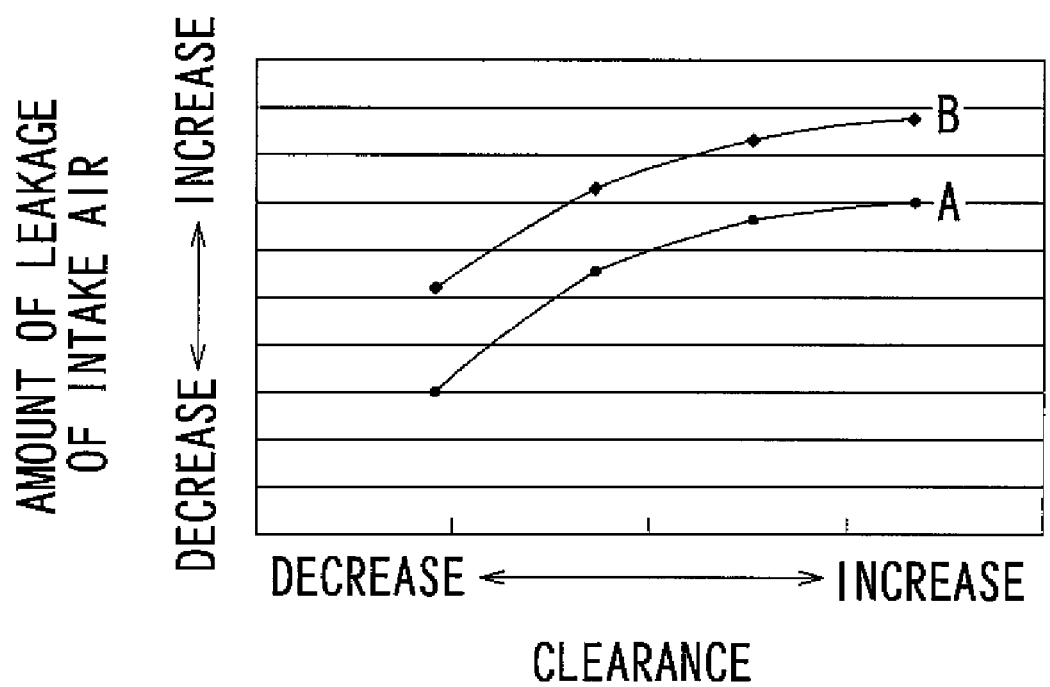
FIG. 9 is a graph with characteristic lines showing the relation between a clearance, which may be produced between valve portions of the valve member and an inner wall of a bore of the throttle body, and the amount of leakage of intake air that may be caused when the valve member is in the fully closed position.
Figure 10:
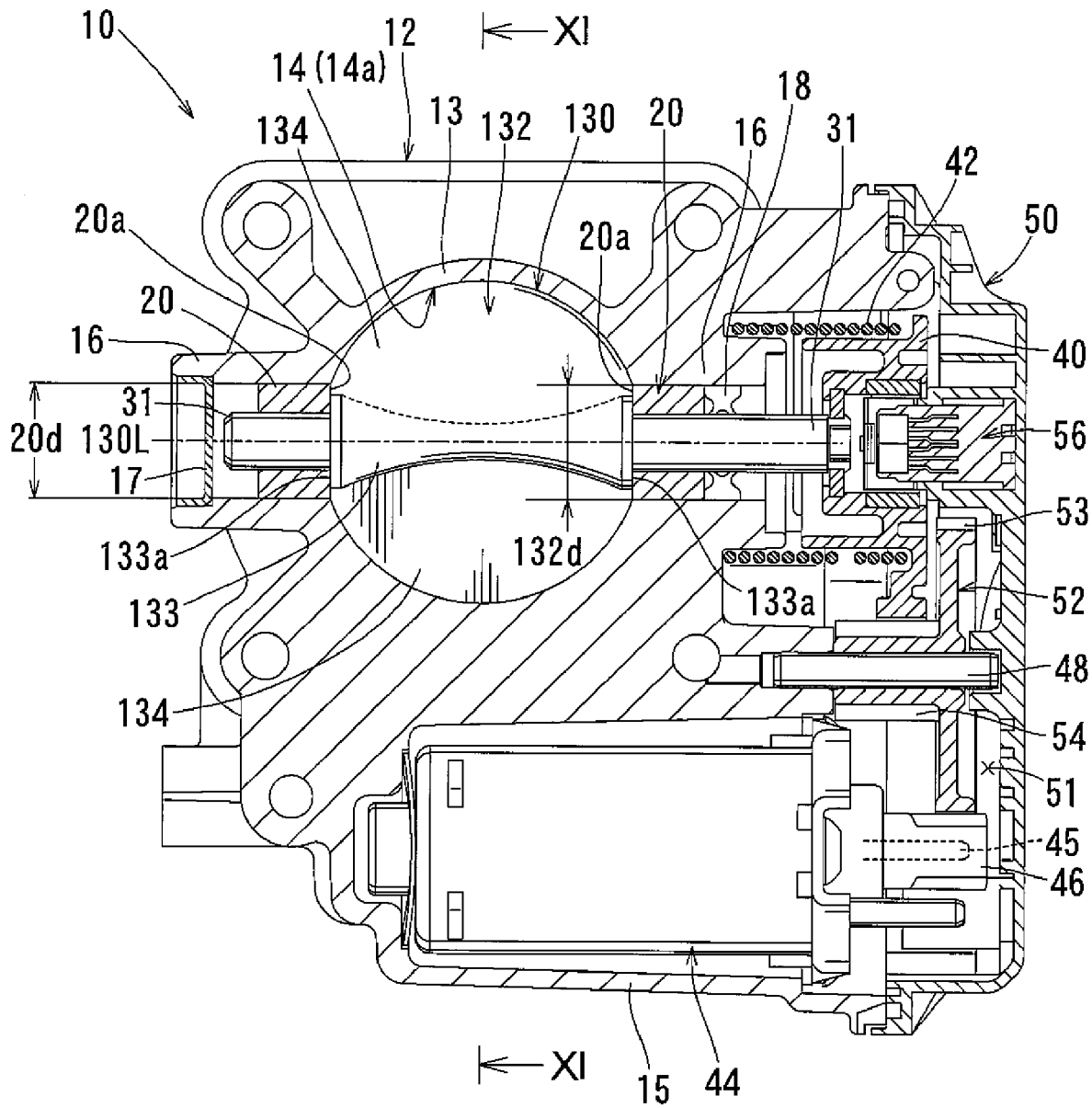
FIG. 10 is a horizontal sectional view of a throttle body incorporating an intake air control valve according to a second embodiment of the present invention.
Figure 11:
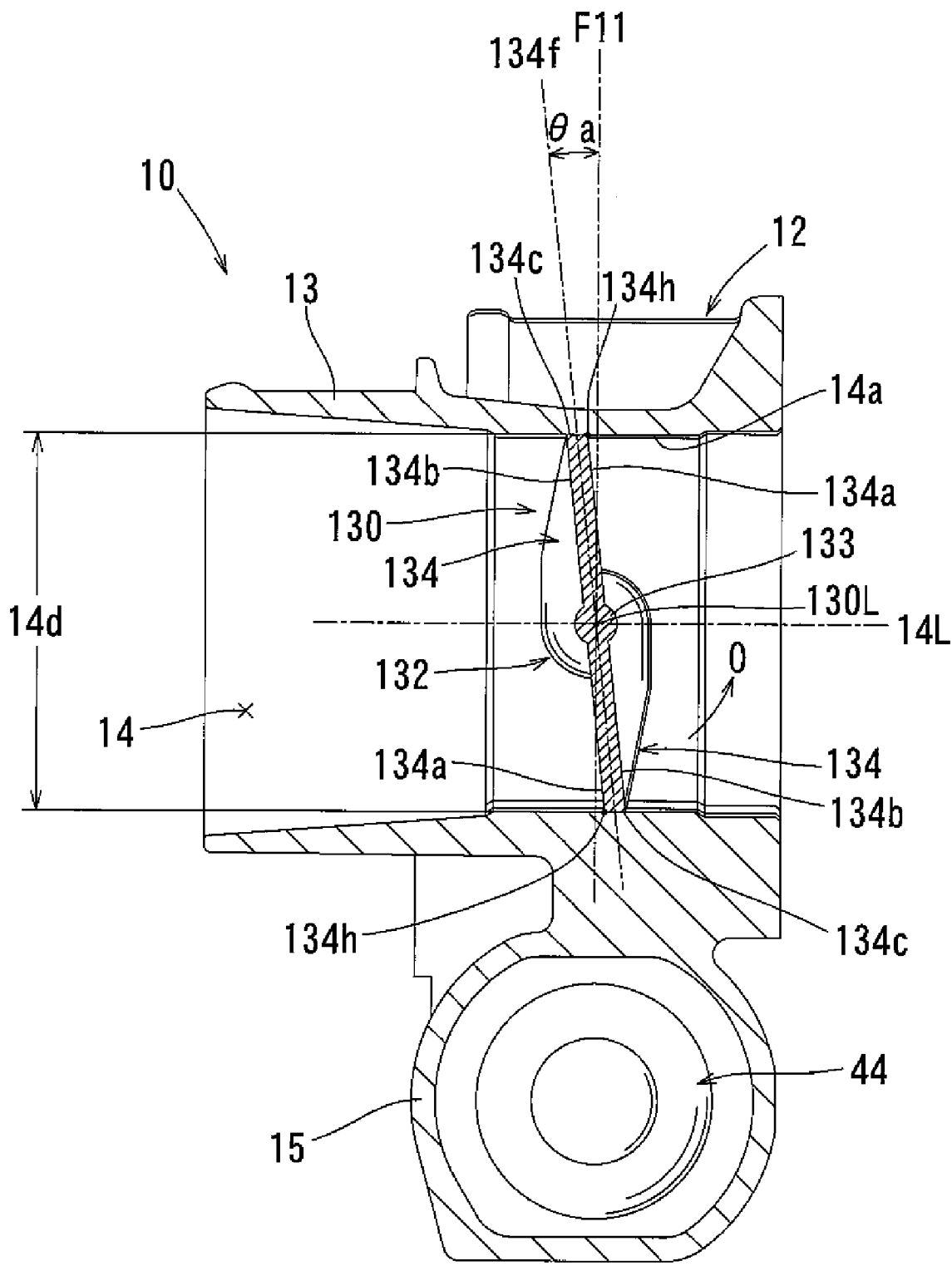
FIG. 11 is a cross sectional view taken along line XI-XI in FIG. 10.
Figure 12:
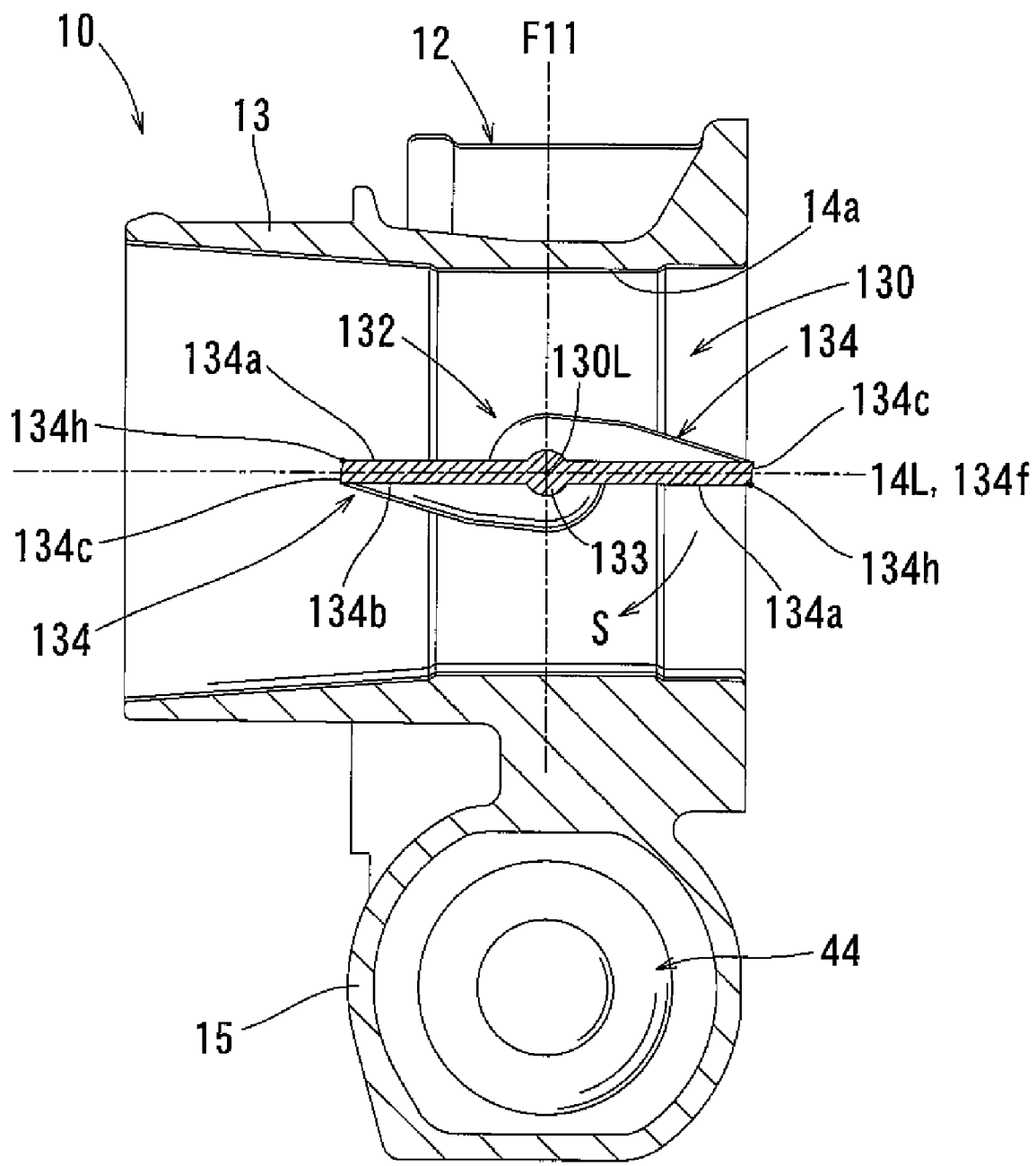
FIG. 12 is a cross sectional view similar to FIG. 11 but showing a valve member in a fully opened position.

In a graph shown in FIG. 9, a clearance between the outer circumferential faces 34c of the valve portions 34 and the inner wall 14a of the bore 14 is plotted as an abscissa and is measured when the valve member 30 is in the fully closed position. The amount of leakage of the intake air is plotted as an ordinate. Characteristic line A was obtained in case of the throttle body 10 according to the embodiment. The amount of leakage of the intake air was represented by a mean value of the measured values that were obtained as a result of measurement. The measurement was performed for several sample valve members each corresponding to the valve member 34 when in the fully closed positions. The sample valve members were prepared to have the thickness 34t(E) (i.e., the thickness 34t on the side of the corresponding shaft portion 31 of each valve portion 34) of 6.5 mm, the thickness 34t(I) (i.e., the thickness 34t on the side of the central portion of each valve portion 34) of 2.5 mm, and an average thickness of 4.0 mm. A characteristic line B was obtained in the case of a known throttle body. The amount of leakage of the intake air was represented by a mean value of the measured values. The measurement was performed for several sample valve members each corresponding to the known valve member and having a thickness of 1.6 mm at their valve portions.

As is clearly seen from FIG. 9, it has been found that, when in the fully closed position, the amount of leakage of the intake air in the case of the throttle body 10 according to the embodiment (see characteristic line A) is smaller than the amount of leakage of the intake air in the case of the known throttle body 10 (see characteristic line B).

Second to fourth embodiments will now be described with reference to FIGS. 10 to 26. These embodiments are modifications of the first embodiment. Therefore, in FIGS. 10 to 26, like members are given the same reference numerals as the first embodiment and the description of these members will not be repeated. Thus, the description will be primarily made to constructions that are different from the first embodiment.

Second Embodiment

Figure 13:
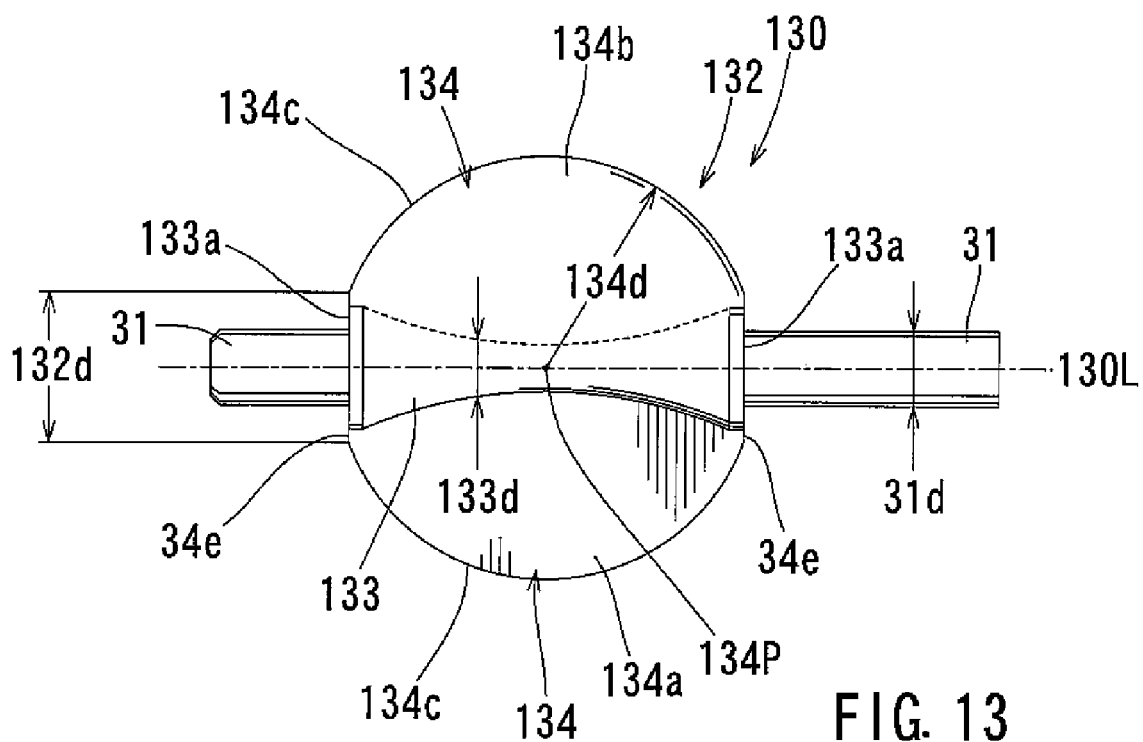
FIG. 13 is a plane view of the valve member.

The second embodiment will now be described with reference to FIGS. 10 to 16. This embodiment relates to a modification of the valve portions 34 of the valve member 30 of the first embodiment. As shown in FIG. 13, a valve member 130 according to this embodiment has a pair of valve portions 134 that are configured to jointly form a disk in appearance (see FIGS. 15 to 17). The disk has a central line or a central plane 134f extending through a rotational axis 130L of the valve member 130. Thus, closing-side faces 134a of valve portions 134 extend within a plane that is parallel to the central line or the central plane 134f.

Similar to the support portion 33 of the first embodiment, a support portion 133 of the valve member 130 supports the valve portions 134 in a cantilever manner (see FIGS. 13 to 17). Also, the support portion 133 has a circular cross sectional configuration and has a diameter 133d that gradually increases from its central portion toward opposite ends along the axial direction. Therefore, when the valve member 130 is in the fully opened position, the projected area of the support portion 133 as viewed in the direction of flow of air within the bore 14 (or the direction as viewed from the upstream side of the valve member 130) is smaller than the projected area of a support portion that has a cylindrical configuration with a diameter corresponding to the maximum value (hereinafter called "maximum diameter 133d(max) of the outer diameter 133d throughout its length. In addition, the outer diameter 133d at the central portion of the support portion 133 is set to be smaller than the shaft diameter 31d of the shaft portions 31 (see FIG. 13). In this embodiment, the radius of the support portion 133 or half the outer diameter 133d is set to be greater than a thickness 134t of the valve portions 134 (see FIGS. 16 and 17).

Figure 14:
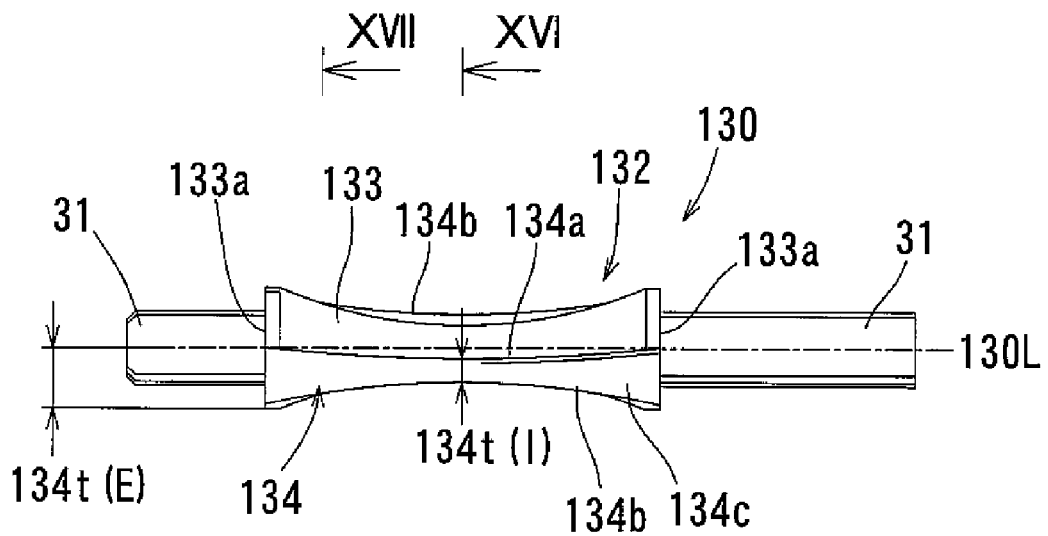
FIG. 14 is a front view of the valve member.
Figure 15:
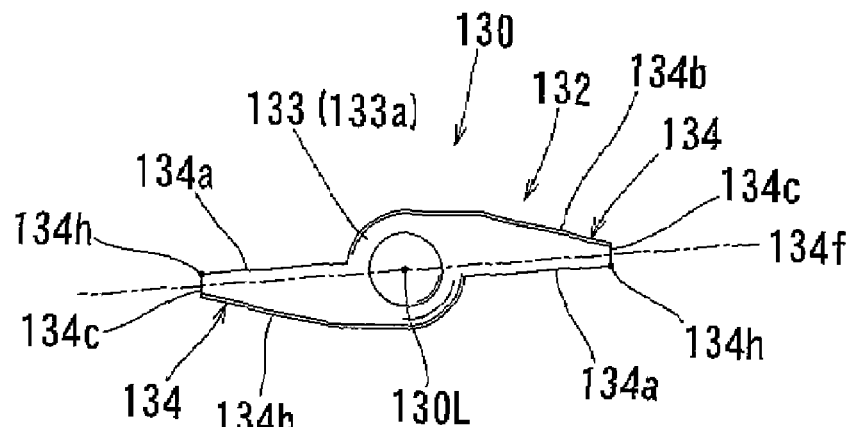
FIG. 15 is a side view of the valve member.
Figure 16:
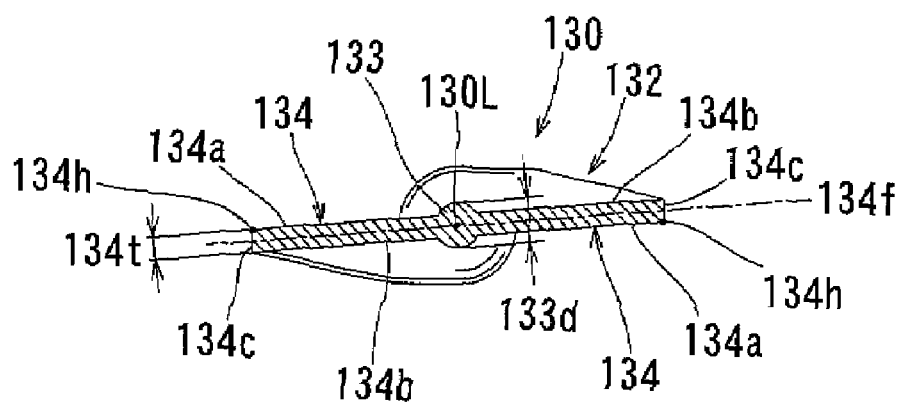
FIG. 16 is a cross sectional view taken along line XVI-XVI in FIG. 14.
Figure 17:
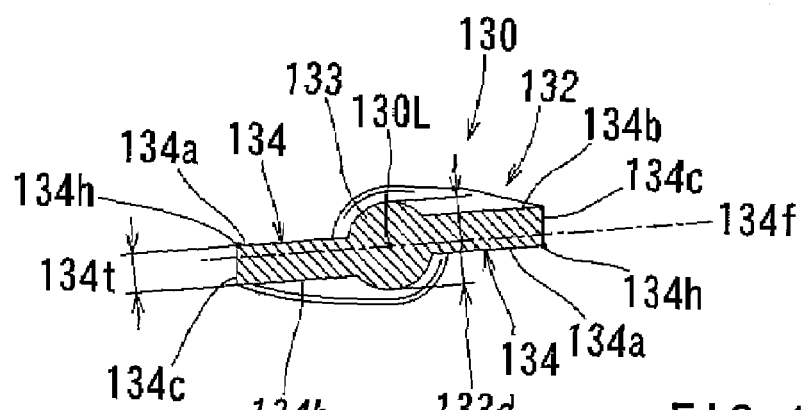
FIG. 17 is a cross sectional view taken along line XVII-XVII in FIG. 14.
Figure 18:
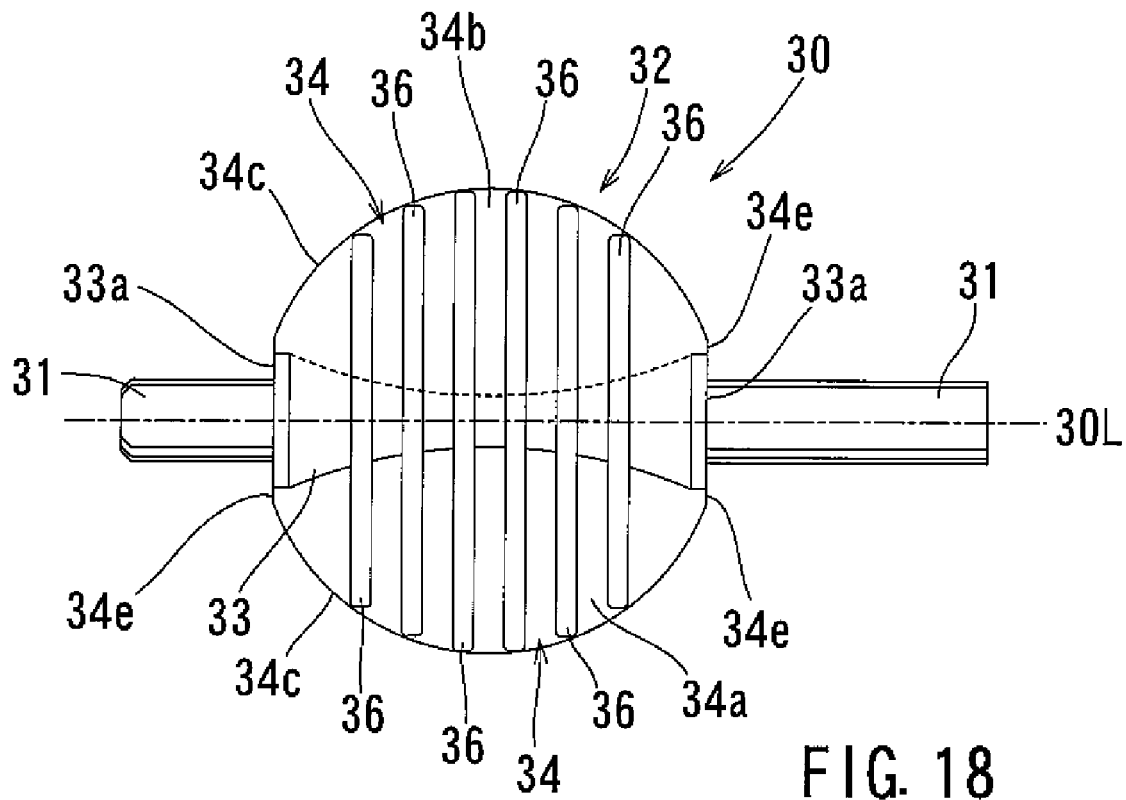
FIG. 18 is a plan view of a valve member of a throttle body according to a third embodiment of the present invention.
Figure 19:
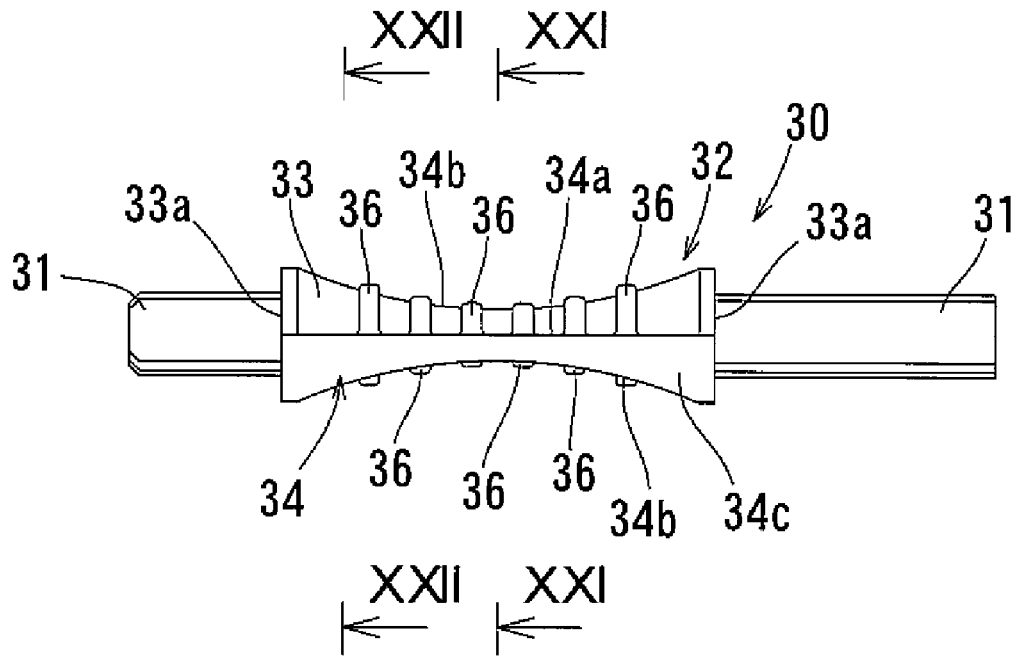
FIG. 19 is a front view of the valve member.
Figure 20:
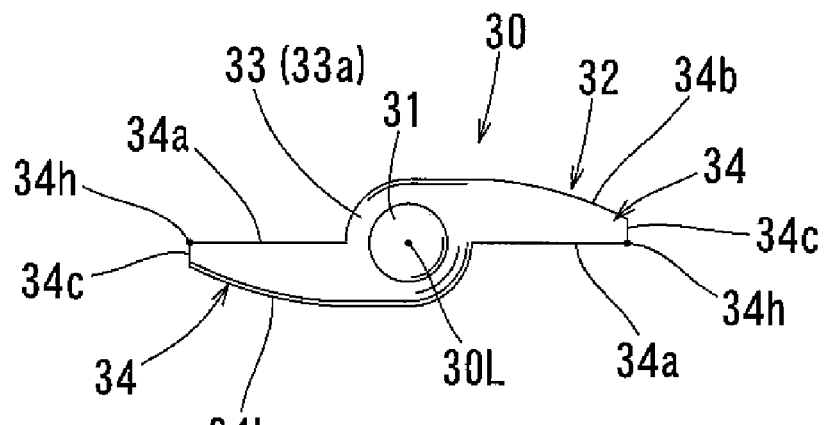
FIG. 20 is a side view of the valve member.
Figure 21:
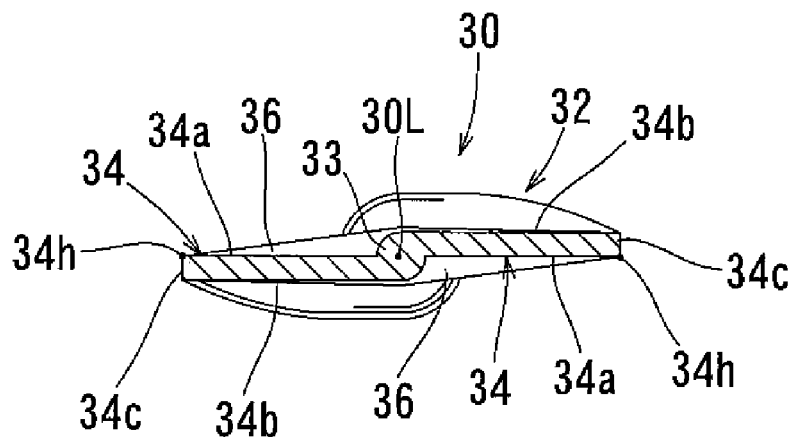
FIG. 21 is a cross sectional view taken along line XXI-XXI in FIG. 19.
Figure 22:
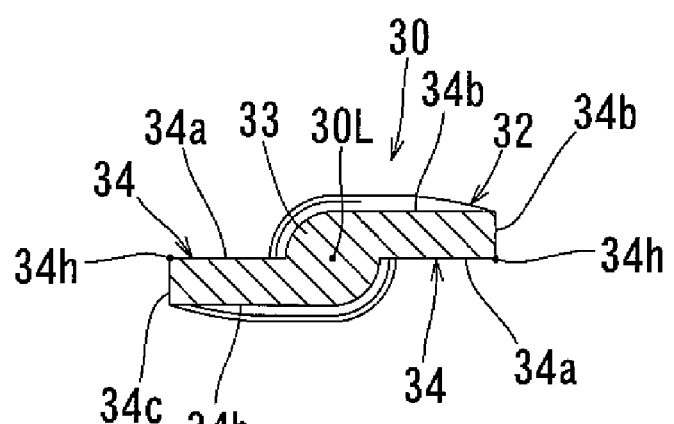
FIG. 22 is a cross sectional view taken along line XXII-XXII in FIG. 19.

Similar to the valve portions 34 of the first embodiment, the thickness 134t of each of the valve portions 134 gradually increases in right and left directions as viewed in FIG. 14 from the central portion toward the side of the shaft portions 31 along the direction of the rotational axis 130L (see FIGS. 16 and 17). Therefore, an opening-side face 134b of each valve portion 134 is configured as a concave curved face with a concave depth. The concave depth on the side of the central portion is deeper than the concave depth on the side of the shaft portions 31 along the direction of the rotational axis 130L (see FIGS. 14 to 17). The thickness 134t of each valve portion 134 is constant along the radial direction of the rotational axis 130L (see FIGS. 16 and 17). Further, similar to the first embodiment, a thickness 134t(E) on the side of the corresponding shaft portion 31 of each valve portion 134 is set to be equal to or more than twice a thickness 134t(I) on the side of the central portion and to be smaller than a predetermined outer diameter 132d (see FIG. 13) of each end face 133a of the support portion 133 (see FIG. 14).

The fully closed position (see FIG. 11) of the valve member 130 is determined to be the position where a central line 134f of the valve portions 134 is inclined by a predetermined set angle θa relative to a plane F11 that extends through the axial line 130L (i.e., the rotational axis) of the valve member 130 and perpendicular to the axis 14L of the bore 14 of the body member 12. In this connection, peripheral corners 134h of the valve portions 134, where closing-side faces 134a intersect with corresponding outer circumferential faces 134c, are displaced in the opening direction (counterclockwise direction about the rotational axis 130L as viewed in FIG. 11) from the plane F11 when the valve member 130 is in the fully closed position. For example, the set angle θa may be determined to be between 6° and 7°.

As the valve member 130 rotates in the opening direction (indicated by arrow 0 in FIG. 11) from the fully closed position (see FIG. 11), the bore 14 is opened. The fully opened position (see FIG. 12) of a valve body 132 is set to be the position where the central line 134f of the valve portions 134 aligns with the axial line 14L of the bore 14. The bore 14 is closed as the valve member 130 rotates in the closing direction (indicated by arrow S in FIG. 12) from the fully opened position (see FIG. 12).

The outer circumferential faces 134c of the valve portions 134 are configured to jointly define a substantially cylindrical surface having a diameter 134d (hereinafter also called "valve diameter 134d") with respect to a point 134P on the rotational axis 130L that is in alignment with the axial line 14L of the bore 14 (see FIG. 13). The valve portions 134 have substantially semi-circular configurations so as to jointly form a single disk having a substantially circular configuration in appearance with the central line 134f extending through the rotational axis 130L of the valve member 130. The valve diameter 134d of each valve portion 134 is set such that, when the valve member 130 is in the fully opened position, the projected area of the valve body 132 as viewed in the direction of flow of air within the bore 14 (or in the direction as viewed from the upstream side of the valve member 130) is slightly smaller than the area defined by the bore diameter 14d. In this connection, the outer circumferential faces 134c of the valve portions 134 are configured as inclined faces that extend parallel to the inner wall 14a of the bore 14 when the valve member 130 is in the fully closed position.

Also with this embodiment, it is possible to achieve substantially the same operation and advantages as the first embodiment. In addition, according to this embodiment, the fully closed position of the valve member 130 can be determined to be the position where free ends of the valve portions 134 contact with the inner wall 14a of the bore 14 or are positioned proximally to the inner wall 14a. More specifically, by determining the set angle θa to be an angle as smaller as possible, the clearance between the outer circumferential faces 134c and the inner wall 14a of the bore 14 can be set such that the clearance becomes smaller from the regions proximal to the opposite ends of the valve portions 134 toward the regions proximal to the free ends of the valve portions 134. Therefore, it is possible to further reduce the amount of leakage of intake air.

Further, the valve portions 134 of the valve member 130 have the closing-side faces 134a and the opening-side faces 134b. Each of the closing-side faces 134a extends within a plane parallel to the rotational axis 130L of the valve member 130 and defines the peripheral corner 134h that is displaced in the opening direction (counterclockwise direction about the rotational axis 130L as viewed in FIG. 11) from the plane F11 when the valve member 130 is in the fully closed position. Each of the opening-side faces 134b is configured as a concave curved face with a concave depth. The concave depth on the side of the central portion along the direction of the rotational axis 130L is deeper than the concave depth on the side of the shaft portion 31. As will be discussed below, this arrangement can improve the operability of the valve member 130 in comparison with the arrangement where the peripheral corners 134h are displaced in the closing direction (clockwise direction about the rotational axis 130L as viewed in FIG. 11) from the plane F11 when the valve member 130 is in the fully closed position.

For example, in the case of the arrangement where the peripheral corners 134h are displaced in the closing direction from the plane F11 when the valve member 130 is in the fully closed position, there is a possibility that the outer circumferential faces 134c of the valve portions 134 frictionally contact with or wedge against the inner wall 14a of the bore 14 if the valve member 130 is operated to open or close from the position in the vicinity of the fully closed position. This may cause degradation in operability of the valve member 130.

Such a problem may not be caused in the case of the arrangement of this embodiment. Thus in this embodiment, the closing-side face 134a of each valve portion 134 of the valve member 130 extends within a plane parallel to the rotational axis 130L of the valve member 130 and defines the peripheral corner 134h that is displaced in the opening direction from the plane F11 when the valve member 130 is in the fully closed position. The opening-side face 134b of each valve portion 134 is configured as a concave curved face with a concave depth. The concave depth on the side of the central portion along the direction of the rotational axis 130L is deeper than the concave depth on the side of the shaft portions 31.

Third Embodiment

A third embodiment will now be described with reference to FIGS. 19 to 22. This embodiment is different from the first embodiment in that a plurality of ribs 36 are formed on each of opposite faces of the valve body 32 of the valve member 30. Here, the opposite faces of the valve body 32 of the valve member 30 include opposite outer faces of the support portion 33 and the closing-side and opening-side faces 34a and 34b of the valve portions 34 of the valve body 32. In this embodiment, six equally spaced parallel ribs 36 are formed on each opposite face of the valve body 32 (see FIG. 18) and extend perpendicular to the rotational axis 30L (see FIGS. 18, 19 and 21).

Also with this embodiment, it is possible to achieve the same operations and effects as the first embodiment. In addition, the ribs 36 formed on each of opposite faces of the valve body 32 can rectify the flow of the intake air.

Fourth Embodiment

Figure 24:
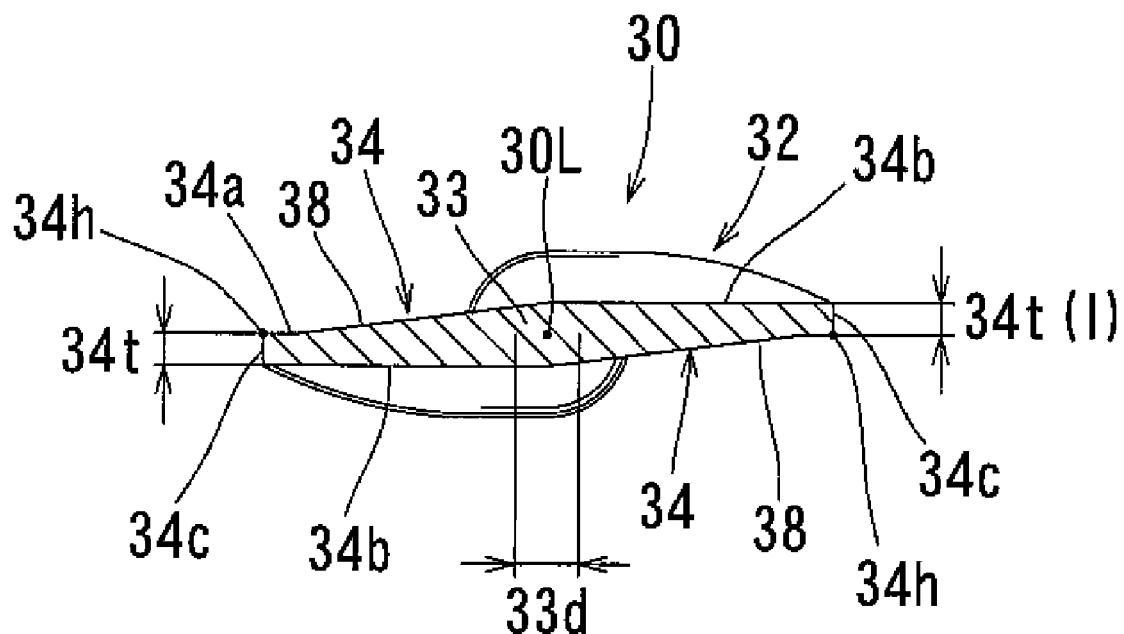
FIG. 24 is cross sectional view similar to FIG. 7 but showing the valve member of the fourth embodiment.
Figure 25:
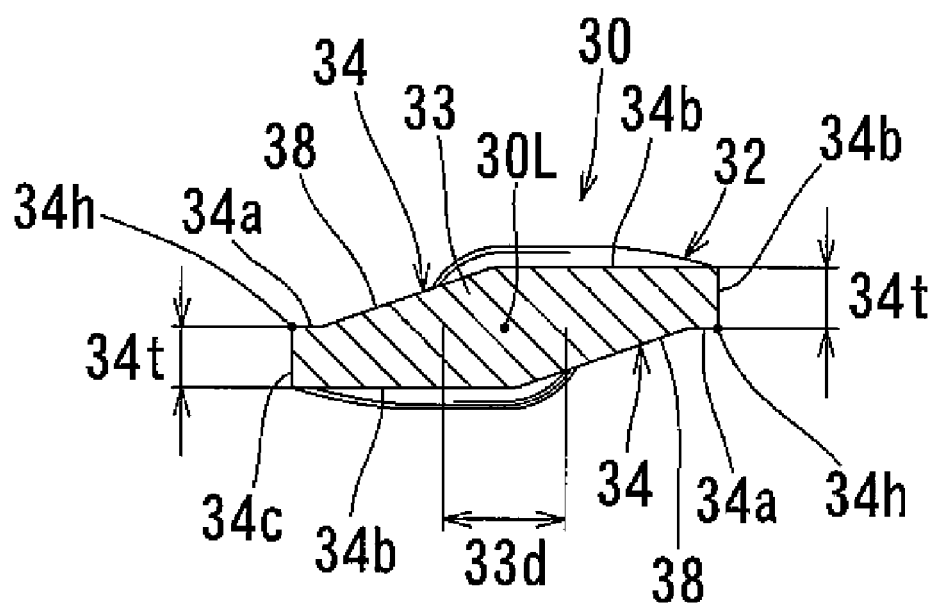
FIG. 25 is a cross sectional view similar to FIG. 8 but showing the valve member of the fourth embodiment.

A fourth embodiment will now be described with reference to FIGS. 23 to 25. This embodiment is different from the first embodiment in that inclined surfaces 38 are formed on opposite faces of the valve body 32 of the valve member 30. The inclined surfaces 38 extend obliquely from the opposite outer faces of the support portion 33 toward the outer peripheral portions of the corresponding valve portions 34 (see FIGS. 23 to 25). In this embodiment, the closing-side face 34a is defined at the outer peripheral portion of each valve portion 34, so that the outer end of the inclined surface 38 is joined to the inner circumference of the closing side face 34a.

Also with this embodiment, it is possible to achieve the same operations and effects as the first embodiment. In addition, the inclined surfaces 38 formed on opposite faces of the valve body 32 can prevent or minimize separation of flow of the intake air from the surface of the valve body 32, so that a smooth flow of the intake air can be provided. Therefore, it is possible to increase the amount of flow of the intake air when the valve member 30 is in the fully opened position (see FIG. 23). Inclined surfaces similar to the inclined surfaces 38 of this embodiment also may be formed on the valve body 132 of the valve member 130 of the second embodiment such that the inclined surfaces extend obliquely from the opposite outer faces of the support portion 133 toward the outer peripheral portions of the corresponding valve portions 134.

Figure 23:
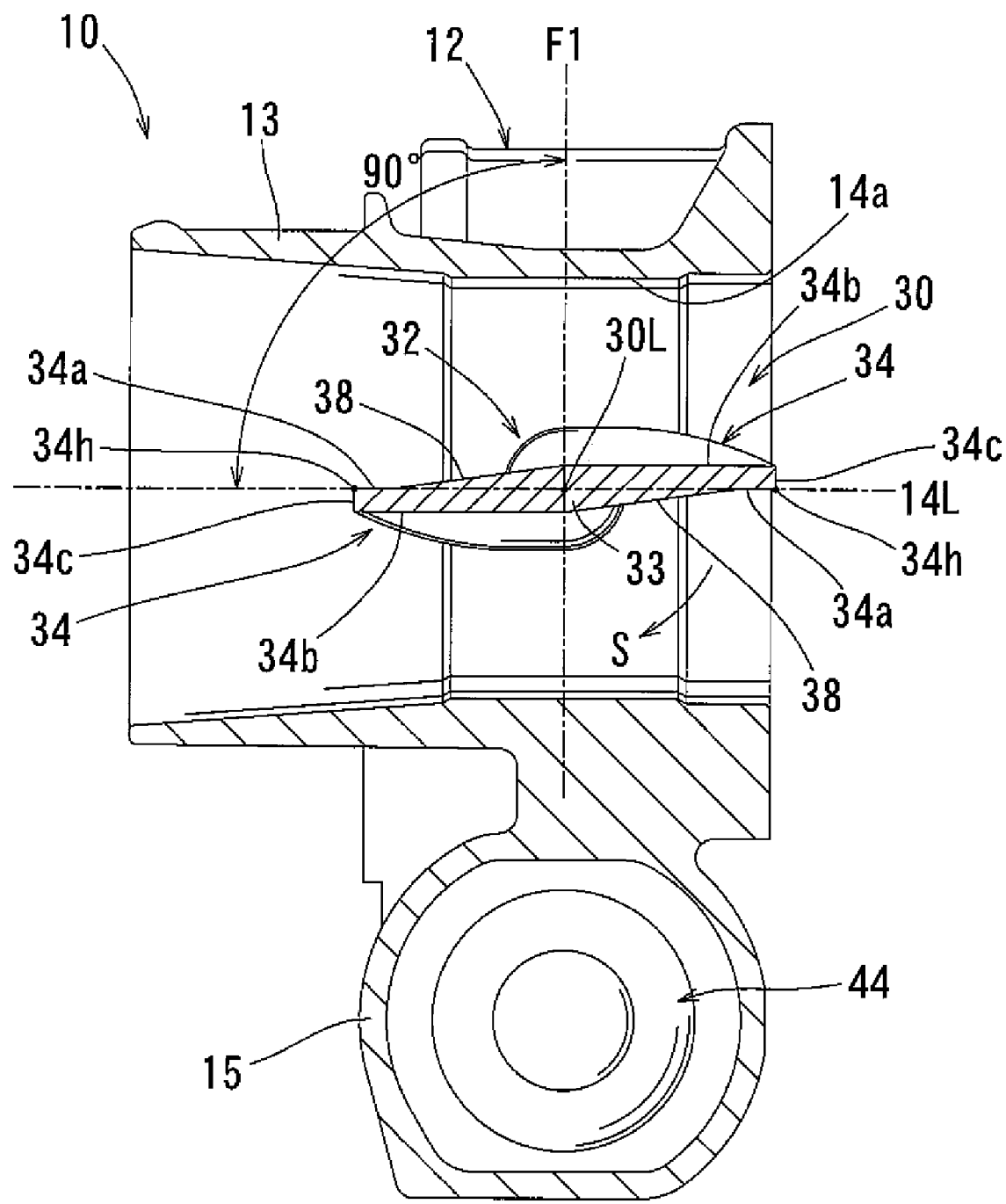
FIG. 23 is a cross sectional view of a throttle body according to a fourth embodiment of the present invention and showing a valve member in a fully opened position.

Further, as shown in FIG. 23, the fully opened position of the valve member 30 according to this embodiment is determined to be the position where the valve member 30 is displaced in the opening direction from the fully closed position (see FIG. 2) by an angle of 90°, i.e., the position where the central line of the valve member 30 extending through the rotational axis 30L aligns with the axial line 14L of the bore 14. In this embodiment, the central line of the valve member 30 is a straight line extending within a plane defined by the closing-side faces 34a of the valve portions 34. This determination of the fully opened position may result significant differences between the cross sectional areas of the upstream side and downstream side valve portions 34 in either the front or the back side of the valve portions 34 with respect to a plane (hereinafter called "reference plane") that extends through the axial line 14L of the bore 14. Thus, the following relational expressions are given:

D1>D2

D3<D4

In the above expressions, D1 represents the cross sectional area of a front side portion (upper side portion as viewed in FIG. 23) with respect to the reference plane of the upstream-side valve portions 34, which is positioned on the left side as viewed in FIG. 23; D2 represents the cross sectional area of a front side portion (upper side portion as viewed in FIG. 23) with respect to the reference plane of the downstream-side valve portion 34, which is positioned on the right side as viewed in FIG. 23; D3 represents the cross sectional area of a back side portion (lower side portion as viewed in FIG. 23) with respect to the reference plane of the upstream-side valve portion 34; and D4 represents the cross sectional area of a back side portion (lower side portion as viewed in FIG. 23) with respect to the reference plane of the downstream-side valve portion 34.

Therefore, when in the fully opened position, the cross sectional areas (D1 and D2) of the front side portions with respect to the reference plane of the upstream-side and downstream-side valve portions 34 are significantly different from each other. Similarly, the cross sectional areas (D3 and D3) of the back side portions with respect to the reference plane of the upstream-side and downstream-side valve portions 34 are significantly different from each other.

Figure 26:
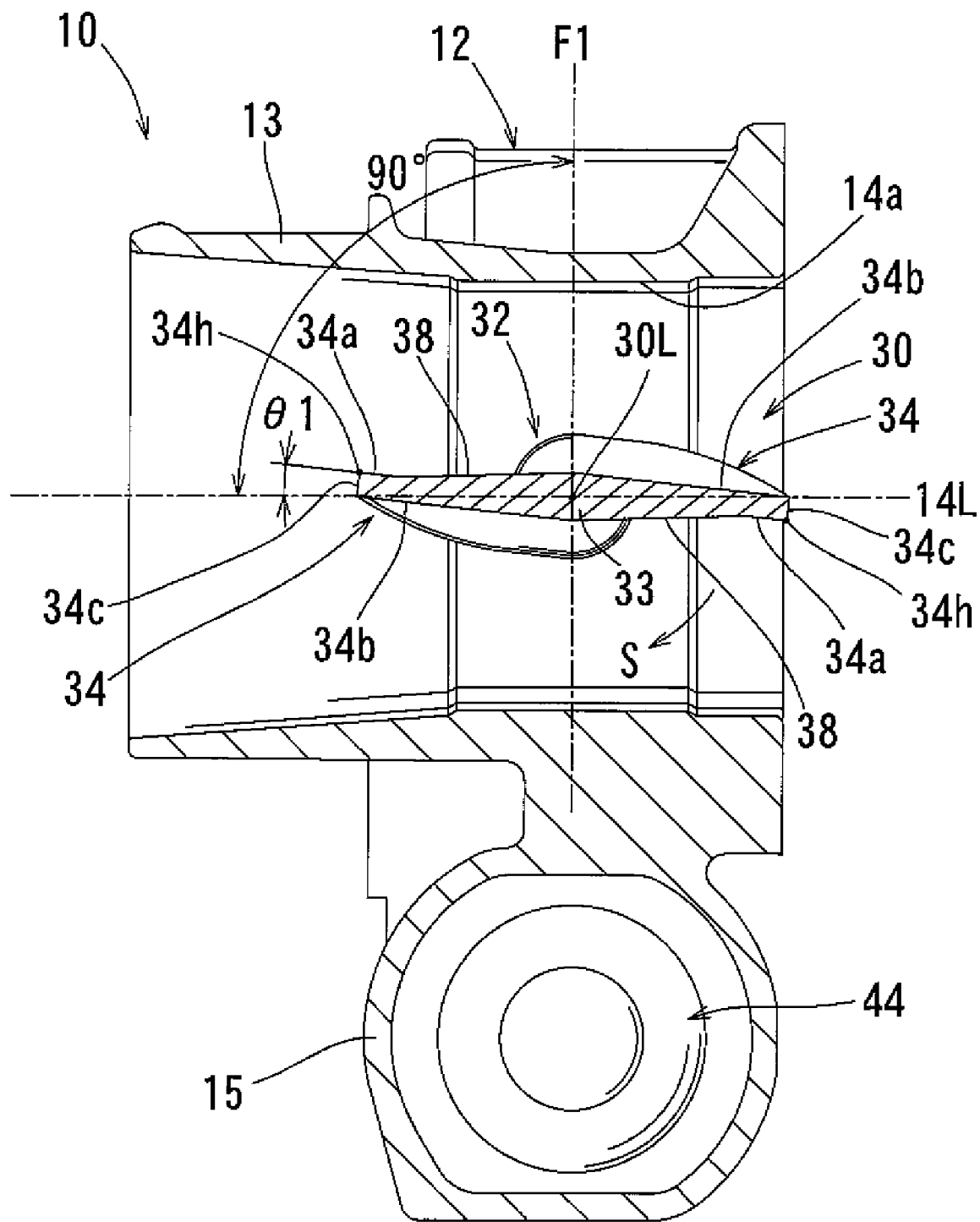
FIG. 26 is a cross sectional view showing an alternative embodiment where a fully opened position is set to a different position from the fourth embodiment.
Figure 27:
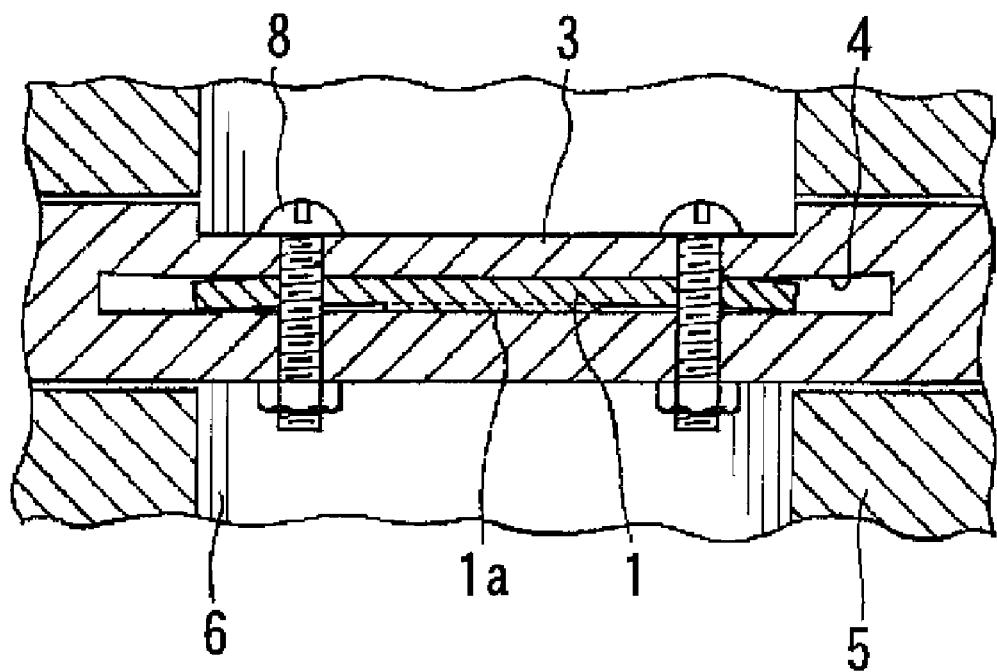
FIG. 27 is a cross sectional view of a known intake air control valve.

For this reason, the fully opened position of the valve member 30 may preferably be determined to a position shown in FIG. 26. In FIG. 26, the fully opened position is determined to be a position where the central line extending through the rotational axis 30L of the valve member 30 is displaced from the reference plane by a small angle of θ1 in the closing direction. Here, the central line is a straight line extending within a plane defined by the closing-side faces 34a of the valve portions 34. Thus, the fully opened position is displaced by an angle (90°−θ1) from the plane F1.

With this determination, it is possible to minimize the differences between the cross sectional areas of the front side portions as well as the differences between the back side portions with respect to the reference plane of the upstream-side and downstream-side valve portions 34. Thus, as the cross sectional area D1 increases, the cross sectional area D3 decreases by a value corresponding to the increased value of the cross sectional area D1. Similarly, as the cross sectional area D2 decreases, the cross sectional area D4 increases by the value corresponding to the decreased value of the cross sectional area D2. Because the difference between the cross sectional areas of the upstream-side and downstream-side valve portions 34 can be reduced or minimized, it is possible to reduce or minimize the loss of pressure of the flow of intake air when the valve member 30 is in the fully opened position. Eventually, it is possible to increase the amount of flow of the intake air in the fully opened position. For example, if the diameter of the bore 14 is 40-45 mm, the angle of θ1 may be set to 5-10°. Preferably, the fully open position of the valve member 30 may be determined to be a position where the relation "D1=D2" and the relation "D3=D4" are given. Also, the fully opened position of the valve member 30 of the first embodiment may preferably be displaced in the closing direction by a small angle.

The present invention may not be limited to the above embodiments, but may be modified in various ways. For example, the material of the body member may not be limited to resin. The body member may be made of any other material, such as metal. In the case that the body member is formed with wall portions that have surfaces opposing to the end faces of the support portion for the valve portions in order to restrict axial movement of the support portion, such wall portions may be construed as "portions or members on the side of the bore defining member." Forming bearing portions integrally with the body member may eliminate separate bearings. In such a case, if the bearing portions define surfaces opposing to the end faces of the support portion, the bearing portions may be construed as "portions or members on the side of the bore defining member." The bearings may be rolling bearings, such as ball bearings and roller bearings. If the rolling bearings are used, their inner races may be mounted to the shaft portions and their outer races may be mounted to the side of the body member. Therefore, the outer races may be construed as "portions or members on the side of the bore defining member."

Although the shaft portions and the valve portions of the valve member are formed into one piece by resin or molded integrally by resin, the valve member can be manufactured in various ways. For example, the valve portions may be molded by resin with metal or resin shaft portions inserted into a die for molding the valve portions. Alternatively, the shaft portions may be molded by resin with metal or resin valve portions inserted into a die for molding the shaft portions. Metal or resin shaft members corresponding to the shaft portions can be manufactured separately from metal or resin valve plates that correspond to the valve portions. The valve plates may be attached to the shaft member by screws to complete a valve member. Forming shaft portions or shaft members by metal can easily ensure the strength of the shaft portions or the shaft members. Further, the shaft portions may be replaced with a single shaft member that extends through the valve body along the rotational axis.

The support portion for the valve portions may be formed integrally with the valve portions or may be formed by the shaft portions. The configuration of the support portion may not be limited to the configuration described above. The support portion may have a cylindrical configuration or a polygonal prism like configuration or any other configurations. The right and left shaft portions may have different diameters from each other. The thickness of each valve portion may be suitably chosen as long as the thickness gradually increases from the central portion toward the side of the corresponding shaft portion along the direction of the rotational axis. Thus, the thickness value or the magnitude of change of thickness can be suitably determined. It should be understood that term "gradual change of thickness" in this specification is used to include change of thickness value along a curved line as well as a stepped line. In addition, although the thickness of the valve portions along the radial direction with respect to the rotational axis is constant in the above embodiments, this thickness can be determined such that it becomes gradually smaller in a direction from the side of the rotational axis toward the radially outer side.

Further, a resilient material such as rubber may be attached to the opening-side face of each valve portion in order to increase the thickness of each valve portion such that the thickness gradually increases from the side of the central portion toward the side of the corresponding shaft portion along the direction of the rotational axis. In such a case, the resilient deformation of the resilient material can be used for further reducing the amount of leakage of the intake air when the valve member is in the fully closed position. This modification is advantageous if it is difficult to form the bore inner wall or the outer circumferential configuration of the valve portions to have a complete circular configuration. Alternatively, an attaching member made of resin or metal may be attached to the opening-side face of each valve portion in order to increase the thickness of each valve portion such that the thickness gradually increases from the side of the central portion toward the side of the shaft portions along the direction of the rotational axis.

This invention claims:

1. An intake air control valve comprising:
 a bore defining member defining a bore through which an intake air flows; and
 a butterfly-type valve member comprising a shaft and a valve body;
 wherein the shaft is rotatably supported by the bore defining member and defining a rotational axis,
 wherein the valve body includes a pair of valve portions joined to the shaft, so that the valve body can rotate in a closing direction and an opening direction between a fully closed position and a fully opened position;
 wherein each of the valve portions has an opening side face, a closing side face and a thickness between the opening side face and the closing side face;
 wherein the thickness of each of the valve portions gradually increases from a central portion toward opposite end portions along a direction of the rotational axis.

2. The intake air control valve as in claim 1,
 wherein the thickness at the end portions of each of the valve portions is set to be twice or more of the thickness at the central portion.

3. The intake air control valve as in claim 1,
 wherein each of the valve portions further includes a closing-side peripheral corner on the side of the closing direction;
 wherein, when the valve member is in the fully closed position, the closing-side peripheral corner is positioned proximally to or within a plane extending through the rotational axis of the valve member and perpendicular to an axis of the bore; and
 wherein the opening side face is configured as a concave face with a concave depth;
 wherein the concave depth at the central portion is deeper than the concave depth at the end portions along the direction of the rotational axis.

4. The intake air control valve as in claim 1,
 wherein each of the valve portions further includes a closing-side peripheral corner on the side of the closing direction;
 wherein the closing side face extends parallel to a plane extending through the rotational axis;
 wherein, when the valve member is in the fully closed position, the closing-side peripheral corner is displaced toward the opening direction from a plane extending through the rotational axis of the valve member and perpendicular to an axis of the bore;
 wherein the opening side face is configured as a concave face with a concave depth; and
 wherein the concave depth at the central portion is deeper than the concave depth at the end portions along the direction of the rotational axis.

5. The intake air control valve as in claim 3,
 wherein the fully opened position is set to a position where a central axis of the valve member extending through the rotational axis is displaced toward the closing direction from the plane extending through the rotational axis of the valve member and perpendicular to an axis of the bore.

6. The intake air control valve as in claim 4,
 wherein the fully opened position is set to a position where a central axis of the valve member extending through the rotational axis is displaced toward the closing direction from the plane extending through the rotational axis of the valve member and perpendicular to an axis of the bore.

7. The intake air control valve as in claim 3,
 wherein the valve body further comprises a support portion configured to support the valve portions;
 wherein the support portion has a central part and opposite end parts along the rotational axis; and wherein the support portion has a projected area as viewed in a direction of flow of the intake air through the bore when the valve member is in the fully opened position:

wherein the projected area at the central part is smaller than the projected area at the opposite end parts.

8. The intake air control valve as in claim 4, wherein the valve body further comprises a support portion configured to support the valve portions;

wherein the support portion has a central part and opposite end parts along the rotational axis; and wherein the support portion has a projected area as viewed in a direction of flow of the intake air through the bore when the valve member is in the fully opened position:

wherein the projected area at the central part is smaller than the projected area at the opposite end parts.

9. The intake air control valve as in claim 3, wherein the valve body further comprises:

a support portion configured to support the valve portions and having opposite outer faces disposed on opposite sides with respect to the thickness of the valve portions; and inclined surfaces extending from the outer faces of the support portion toward radially outer peripheries along the rotational axis of the valve portions.

10. The intake air control valve as in claim 9, wherein the inclined surfaces are formed on the closing side of the valve body and extending between the outer faces of the support portion and the closing side faces of the valve portions.

11. The intake air control valve as in claim 10, wherein the inclined surfaces are inclined relative to the bore axis when the valve member is in the fully opened position.

12. The intake air control valve as in claim 4, wherein the valve body further comprises:

a support portion configured to support the valve portions and having opposite outer faces disposed on opposite sides with respect to the thickness of the valve portions; and inclined surfaces extending from the outer faces of the support portion toward radially outer peripheries along the rotational axis of the valve portions.

13. The intake air control valve as in claim 12, wherein the inclined surfaces are formed on the closing side of the valve body and extending between the outer faces of the support portion and the closing side faces of the valve portions.

14. The intake air control valve as in claim 13, wherein the inclined surfaces are inclined relative to the bore axis when the valve member is in the fully opened position.

15. The intake air control valve as in claim 1, wherein the valve portions of the valve member are molded by resin.

16. The intake air control valve as in claim 1, wherein the shaft comprises a pair of shaft members disposed on opposite sides of the valve body along the rotational axis.

17. The intake air control valve as in claim 1, wherein the shaft comprises a single shaft member extending through the valve body along the rotational axis.

18. An intake air control valve comprising:

a body member defining a bore through which an intake air flows; and a butterfly-type valve member having a rotational axis and rotatably disposed within the bore;

wherein the valve member comprises a valve body having a first face, a second face and a thickness between the first face and a second face;

wherein the first face and the second face are disposed on opposite sides with respect to a rotational direction of the valve body;

wherein the valve body further includes a central portion and opposite end portions along a direction of the rotational axis; and wherein the thickness of the central portion is less than the thickness of the end portions.

19. The intake air control valve as in claim 18 wherein the valve body comprises a support portion and a pair of valve portions;

wherein the support portion extends along the rotational axis and the pair of valve portions are disposed on opposite sides of the support portion;

wherein the thickness at each of the support portion and the pair of valve portions of the valve body gradually increases from the central portion toward the opposite end portions.

20. An intake air control valve comprising:

a body member defining a bore through which an intake air flows; and a butterfly-type valve member having a rotational axis and rotatably disposed within the bore;

wherein the valve member comprises a valve body having a support portion and a pair of valve portions;

wherein the support portion extends along the rotational axis and the pair of valve portions are disposed on opposite sides of the support portion;

wherein each of the valve portions has an opening side face and a closing side face;

wherein the opening side face defines a flat surface and the closing side face defines a concave face, so that a thickness of each of the valve portions gradually increases from a central portion toward opposite end portions along a direction of the rotational axis;

wherein the support portion has a central part and oppose end parts along the rotational axis; and wherein the support portion has a cross sectional area that gradually increases from the central part toward the opposite end parts.

* * * * *